United States Patent [19]
Gilman et al.

[11] Patent Number: 5,757,781
[45] Date of Patent: May 26, 1998

[54] DYNAMIC INSERTION AND REMOVAL OF MULTI-MEDIA CALL-HANDLING RESOURCES INTO/FROM VIDEO CALLS TO PROVIDE CALLING FEATURES

[75] Inventors: Robert Reagan Gilman; Gary Steven King, both of Broomfield; Albert Daniel Pessot, Boulder, all of Colo.

[73] Assignee: Lucent Technologies Inc., Murray Hill, N.J.

[21] Appl. No.: 528,505

[22] Filed: Sep. 14, 1995

[51] Int. Cl.$^6$ .................................................. H04M 3/56
[52] U.S. Cl. ............................ 370/260; 379/201; 348/15
[58] Field of Search .............................. 370/259, 260, 370/261, 264, 265, 522, 524, 465, 466; 379/201, 202, 204, 205, 215, 93, 96, 93.01, 93.17, 93.21, 211, 212; 348/15, 17, 18; 364/514 R

[56] References Cited

U.S. PATENT DOCUMENTS

| | | | |
|---|---|---|---|
| 4,232,199 | 11/1980 | Boatwright et al. | 379/201 |
| 4,710,917 | 12/1987 | Tompkins et al. | |
| 4,763,317 | 8/1988 | Lehman et al. | |
| 5,101,427 | 3/1992 | Kotani et al. | |
| 5,184,345 | 2/1993 | Sahni | |
| 5,195,087 | 3/1993 | Bennett et al. | 370/264 |
| 5,305,312 | 4/1994 | Fornek et al. | 370/264 |
| 5,313,459 | 5/1994 | Matern | 379/201 |
| 5,450,123 | 9/1995 | Smith | 379/201 |
| 5,625,407 | 4/1997 | Biggs et al. | 370/260 |

FOREIGN PATENT DOCUMENTS

| | | |
|---|---|---|
| 27752 | 1/1990 | Japan. |
| 3205953 | 9/1991 | Japan. |

OTHER PUBLICATIONS

European Telecommunication Standard, *Integrated Services Digital Network* (ISDN); Audiovisual services . . ., ETS 300 145, May 1994, pp. 7-25.

International Telecommunication Union (ITU), *Line Transmission of Non–Telephone Signals*, ITU-T Recommendation H.320 03/93, pp. 1-12.

International Telegraph and Telephone Consultative Committee (CCITT), *Recommendations of the H–Series*, Study Group XV (Geneva Meeting, 16-27 Jul. 1990), COM XV-R 37-E Aug. 1990, pp. 1-123.

Brochure: *The AT&T MultiPoint Control Unit A Member of the AT&T World Work$^{TM}$Family*, Copyright of AT&T 1994, pp. 1-4.

AT&T 555-027-725, *MultiPoint Conferencing*, Multipoint Control Unit (MCU), Issue 3 MCU R2.0, Sep. 1994, pp. 1-1—1-13.

AT&T 555-027-721, *Architecture*, MultiPoint Control Unit (MCU), Issue 3, Sep. 1994, pp. 2-1—2-16; 3-1—3-21; 4-1—4-4; 4-41—4-45; 9-1—9-12—9-13.

Brochure: *The AT&T Conference Reservation System*, Copyright of AT&T 1994, pp. 1-2.

Advertisement: *Cameo Personal Video System*, CLI$^R$, Copyright of Compression Labs, Inc. 1992, pp. 1-2.

Advertisement: *OKI Video Phone*, Oki Electric Industry Co., Ltd., pp. 1-2.

*Primary Examiner*—Chau Nguyen
*Attorney, Agent, or Firm*—David Volejnicek

[57] ABSTRACT

A switching system (100) inserts H.320 multi-media protocol-terminating resources (156) into an existing call dynamically, only when the resources are needed, and also removes the resources from an ongoing call dynamically, when the resources are no longer needed, whereby the switching system can provide call features such as hold, conference, disconnect, drop, and transfer, to an H.320 multi-media call and can do so spontaneously, whenever desired during the call, without tying up the resources for the duration of the call even when they are not needed. To extend these capabilities to both single-channel and multi-channel multi-media ISDN BRI calls, the switching system associates a plurality of calls that constitute the individual channels of a multi-channel call and treats the associated calls identically and in unison for purposes of insertion and removal of resources and the providing of features.

43 Claims, 26 Drawing Sheets

DYNAMIC INSERTION AND REMOVAL OF MULTI-MEDIA CALL-HANDLING RESOURCES INTO/FROM VIDEO CALLS TO PROVIDE CALLING FEATURES

TECHNICAL FIELD

This invention relates generally to multi-media telecommunications and relates specifically to efficiently providing telecommunications features to video telecommunications.

BACKGROUND OF THE INVENTION

Video telecommunications typically include more than just moving-image information; they commonly include audio information, and may include other data as well. Hence, video telecommunications are truly multi-media telecommunications. Video telecommunications are conventionally implemented in accordance with the International Telecommunications Union (ITU, formerly CCITT) H.320 standard. H.320 is actually an umbrella of standards that encompasses individual standards in the ITU H and G standards series for narrowband visual telephone systems and terminal equipment, and covers video conferencing, audio, video, graphics, encryption, and multipoint.

The H.320 standard provides for a single telecommunication—a single video call—to proceed over one or more telecommunications channels—for example, over one or more B channels of an ISDN basic rate interface (BRI) or primary rate interface (PRI) link. This means that multiple channels may need to be coordinated into a single call by both the telecommunications endpoints (e.g., video terminals) and the telecommunications (e.g., telephone) network that interconnects these endpoints. The coordination of multiple channels by the endpoints is covered by the H.320 standard. While the coordination of multiple channels into a single call by the network is covered by the ISDN standards, the ISDN BRI implementational conventions have not incorporated this feature. So the network facilities, particularly switching systems, treat individual channels of multi-channel calls on ISDN BRI links as separate calls. Therefore, there is a problem of how to coordinate multiple channels into a single call in the conventional ISDN BRI environment.

The H.320 standard uses a telecommunications protocol, defined in the H.221 standard, which is an end-to-end (i.e., terminal-to-terminal) protocol that is normally transparent to (i.e., passed through without termination) by the network facilities. Because the network facilities such as telephone switching systems do not normally have access to the protocol, they generally cannot provide telecommunications features to video calls that they commonly provide to other types of calls. These features include "hold", "transfer", "conference", and "drop". Therefore, another problem is how to provide these telecommunications features for video calls.

The H series of standards does provide a mechanism for conferencing of video calls. Defined in the H.231 and H.234 standards, it is known as the multipoint control unit (MCU). The MCU is a stand-alone video conference bridge that is analogous, from the users' viewpoint, to a call-up audio conference bridge. In order to set up a video conference, a user must call an administrator of the MCU and define the user's requirements, such as how many users will participate in the conference. The administrator gives the user a list of telephone numbers of the MCU, one for each conference participant, and sets up the MCU for the conference. The user gives one of the telephone numbers to each of the conference participants. All of the conference participants then call their respective telephone numbers to become connected to the MCU, and the MCU conferences their calls.

As the above description illustrates, video conferencing via the MCU is a pre-planned and fairly complex procedure. A major disadvantage of the MCU is that it does not allow for the spontaneous, or dynamic, expansion of an existing point-to-point call into a conference—a feature that is common in telephony, where a 3-way conference can be established at the push of a CONFERENCE button on the telephone. Another disadvantage of the MCU is that all of the conferencing facilities —the MCU—that have been assigned to the call are occupied by the conference call even when they are not needed, that is, prior to more than two parties becoming involved in the conference and subsequently to all but two of the parties dropping out of the conference (i.e., when the conference call is in reality only a point-to-point call). Hence, another problem is how to overcome the lack of spontaneous video conferencing and the resource misuse involved in MCU-effected video conferencing.

SUMMARY OF THE INVENTION

This invention is directed to solving these and other problems and disadvantages of the prior art. Generally according to principles of the invention, multi-media protocol-terminating resources are inserted by a switching system into an existing call dynamically, only when the resources are needed, and preferably they are also removed by the switching system from an ongoing call dynamically, when the resources are no longer needed. The termination of the multi-media protocol at the switching system enables the switching system to provide telecommunications features to the call. The dynamic insertion and removal of protocol-terminating resources ensures that features, such as conferencing, can be provided spontaneously, whenever desired during a call, yet ensures that these resources are used efficiently, only when needed. Furthermore, a plurality of calls can be associated by the switching system, and the associated calls are treated identically and in unison for purposes of insertion and removal of protocol-terminating resources and the providing of features. The associated calls can be the individual channels of a single video call, thereby extending the abovementioned advantages to video and other multi-channel calls in the ISDN BRI environment.

Specifically according to the invention, a switching system for establishing and disestablishing switched communications connections between communications endpoints that are connected to the switching system, and wherein communications are conducted by the endpoints through the established connections in a multi-media communications protocol that is not terminated at the switching system, is improved by equipping the switching system with means for terminating the protocol at the switching system, and means for dynamically inserting the terminating means into a selected already-established connection, to terminate the protocol of the selected connection at the switching system in order to provide a communications feature at the switching system for the communications on the selected connection. The switching system is preferably further improved by also providing it with means for dynamically removing the inserted terminating means from the selected connection without disestablishing the selected connection, to cease terminating the protocol of the selected connection at the switching system upon ceasing or completing the providing of the feature at the switching system for the communication on the selected connection. The selected connection may comprise the call paths of a plurality of calls. Preferably, the decision to insert the terminating means into an established connection, or to remove them from an ongoing connection, is made on the following bases: the terminating means are inserted unless, and are removed when, (a) the connection does not connect any multi-media endpoints, or (b) the connection connects to only one endpoint and the one endpoint is a multi-media endpoint, or (c) the connection connects only two endpoints and both of the two endpoints are multi-media endpoints. Alternatively, basis (c) may be changed to: the connection connects only two endpoints and both of the two endpoints are multi-media endpoints and neither of the two endpoints is on hold.

Illustratively according to the invention, a switching system comprises the following elements. A plurality of communications ports that connect the switching system to communications endpoints. A switching fabric that interconnects the plurality of ports and establishes and disestablishes switched communications paths between selected ones of the ports to enable endpoints that are connected to ports that have a path established between them to conduct a call through the path in a multi-media communications protocol that passes between the endpoints without being terminated at the switching system. Means for terminating the protocol at the switching system. Means for firstly determining that the protocol of an individual existing call needs to be terminated at the switching system, and for secondly determining that the protocol of the individual existing call no longer needs to be terminated at the switching system. And means responsive to the first determination of the determining means for causing the switching fabric to connect the terminating means into the path of the existing call in order to commence terminating the protocol of the existing call at the switching system, and further responsive to the second determination of the determining means for causing the switching fabric to disconnect the terminating means from the path of the existing call in order to cease terminating the protocol of the existing call at the switching system and resume passing the protocol between the endpoints that have the path established between them without terminating the protocol at the switching system. Preferably, the switching system can associate a plurality of calls (such as those calls that constitute the individual channels of a single video call) and insert or remove the terminating means into or from their call paths in unison.

These and other advantages and features of the invention will become more apparent from the following description of an illustrative embodiment of the invention taken together with the drawing.

DETAILED DESCRIPTION

Figure 1:
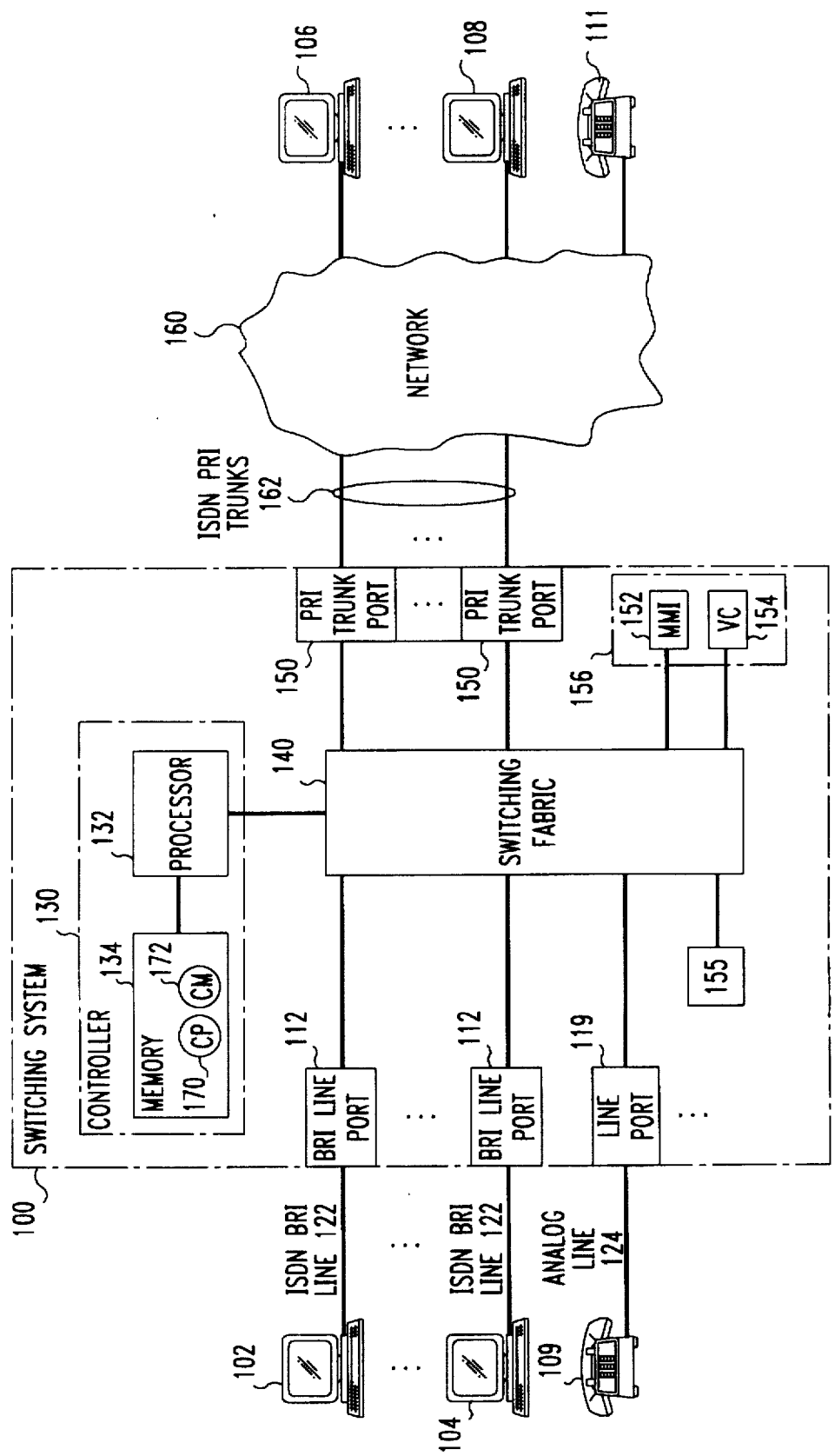
FIG. 1 is a block diagram of a telecommunications system that includes an illustrative embodiment of the invention.

FIG. 1 shows an illustrative video telecommunications system. It includes a switching system 100, such as a multi-media private branch exchange (PBX) that provides video telecommunications services for video terminals 102 and 104 that are connected to switching system by respective ISDN BRI lines 122, and that provides conventional telephone communications services for conventional telephone terminals 109 that are connected to switching system 100 via conventional analog telephone lines 124. To provide connections of terminals 102–104 and 109 to remote video terminals 106–108 and telephone terminals 111, switching system 100 is connected by ISDN PRI trunks 162 to a telecommunications network 160. Network 160 is illustratively the public telephony network. Video terminals 102–108 are illustratively the AT&T Vistium™ video terminals. They carry on video communications over ISDN BRI lines using the techniques and protocols of the H.320 standard.

Switching system 100 is illustratively an enhanced version of the AT&T Definity® PBX. It conventionally includes ISDN BRI port circuits 112 for connecting to ISDN BRI lines 122, analog line port circuits 119 for connecting to analog phone lines 124, and ISDN PRI port circuits 150 for connecting to ISDN PRI trunks 162. It also includes service circuits 155, such as tone generators, recorded announcement players, etc. The port circuits and the service circuits are conventionally interconnected by a switching fabric 140, which is a time-division multiplex (TDM) bus in the case of the Definity PBX. Switching system 100 further conventionally includes a controller 130 for controlling its operation. Controller 130 includes a memory 134 which stores control programs and a processor 132 that executes the control programs out of memory 134. Controller 130 is connected to the port circuits and the service circuits through switching fabric 140. According to the invention, switching system 100 is enhanced by inclusion therein of multi-media (video call) resources 156. Resources 156 are service circuits that provide the necessary physical resources for reconfiguring video calls. These include resources for selecting or combining video call traffic and for terminating video communications protocols.

Illustratively, resources 156 comprise a multi-media interface (MMI) 152 (AT&T circuit pack code no. TN 787C) and a voice conditioner (VC) 154 (AT&T circuit pack code no. TN 788) of the commercially-available AT&T Multi Point Control Unit (MCU). MMI 152 provides the H.221 protocol and BONDing terminations for data received from the port circuits. It demultiplexes incoming bit streams in the H.221 or BONDed signal (including audio, video, data, and control and indication signals) and routes the demultiplexed data to switching fabric 140 for processing in the appropriate port circuits and VC circuits. In addition, the multimedia interface receives data bit streams from various system circuits (such as conferenced audio, broadcast video, broadcast data, and control and indication), generates the H.221 framing signals, and multiplexes the data into a single H.221 bit stream for transmission to the original port circuit. MMI 152 (in conjunction with connection management 172) supports all the relevant H-series specifications: H.231, H.243, H.221, H.230, and H.242. It also supports all bonded and non-bonded calls. "Bonding" is a standard for aggregating or concatenating of multiple B channels into a single call; it is one way of associating single-channel calls into a multi-channel call. Each multimedia interface circuit pack terminates as many as 32 B-channels in any combination as long as the aggregate bandwidth does not exceed 32 B-channels. The multimedia interface circuit pack communicates with controller 130 using a standard control channel of switching fabric 140.

Each VC 154 provides the circuits necessary to perform voice processing tasks for as many as four endpoints in a conference. Voice processing includes encoding, decoding, and summing of audio signals. In addition, the voice conditioner circuit pack can provide mixed conference processing for G.711 PCM (A-law and μ-law) with G.728 LD-CELP, and voice energy detection information for processor 132 to use for voice-energy-activated switching.

Included among the control programs in memory 134 of switching system 100 are call processing 170 and connection management 172. These are substantially conventional control programs that conventionally serve voice and data calls and that have been enhanced to handle video (multimedia) calls properly and efficiently in terms of resource utilization. Their departures from conventional functionality are diagrammed in FIG. 2 and FIGS. 3–5, respectively.

Figure 2:
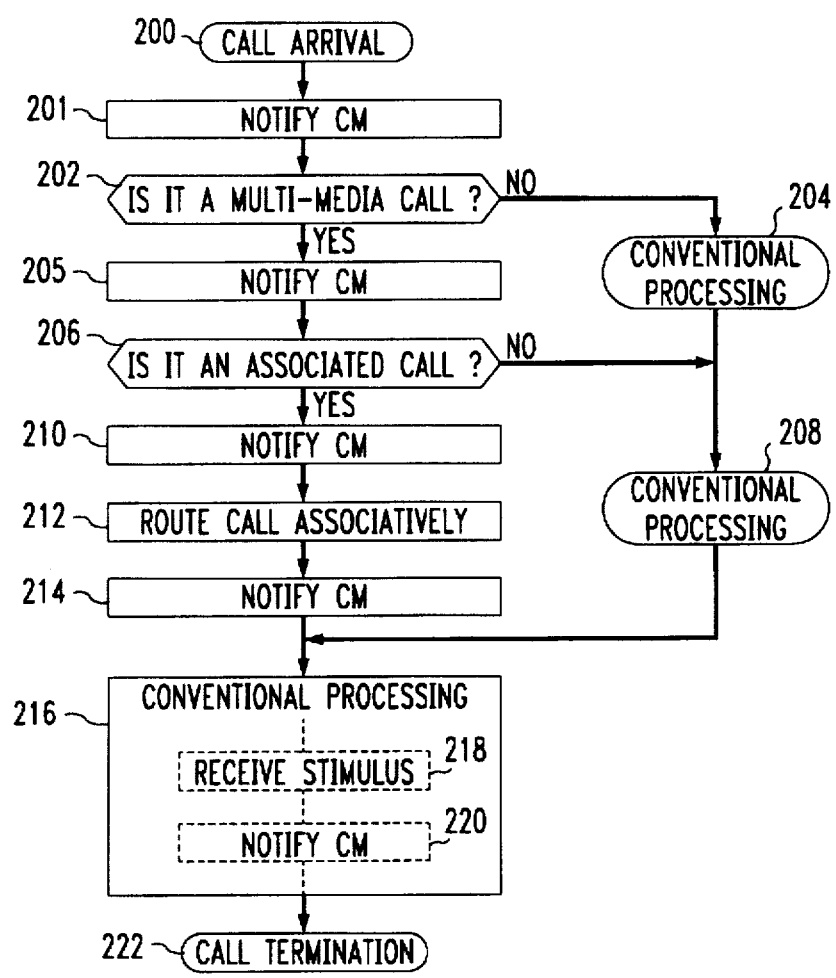
FIG. 2 is a functional flow diagram of call processing of a switching system of the telecommunications system of FIG. 1.

Call processing 170 identifies multi-media calls, associates multiple single-channel calls for the purpose of providing multi-channel calls, and properly routes the calls. (References to a program as performing a function will, of course, be understood to mean processor 132 performing the function while executing the program.) The operation of call processing 170 with respect to multi-media calls is shown in FIG. 2. Execution of call processing 170 is invoked when a call arrives at switching system 200 via one of the lines 122 or 124 or one of the trunks 150, at step 200. In response, call processing 170 notifies connection management 172 of the call, at step 201, and then determines whether or not the call is a multi-media call, at step 202. This determination is made in part on the basis of the call's bearer capability, as indicated by the BEARER information element (IE) in the call's ISDN SETUP message; illustratively, if the call is indicated to be either a 56 kbps or a 64 kbps data call, it may be a multi-media call. It is reported as a port type (e.g., a multi-media port) to connection management 172. The determination is enhanced on the basis of translation data that has been administered in switching system 100 for the call's origination endpoint and/or destination endpoint. However, switching system 100 has translation data only for endpoints 102–104 and 109 that it serves directly, and hence it will not have translation data for a remote origination endpoint or a remote destination endpoint (e.g., endpoints 106–108 and 111). Therefore, a call is always assumed to be a multi-media call if its BEARER information identifies it as such, unless the available translation data for one or both endpoints indicate a non-multi-media endpoint.

If the call is not determined at step 202 to be a multi-media call, call processing 170 proceeds to process and route the call in a conventional manner, at steps 204 and 208. If the call is determined to be a multi-media call, call processing 170 notifies connection management of this fact, at step 205, and then determines whether the call is associated with another call, at step 206. Under the ISDN BRI protocol, multi-channel calls are initially established as separate single-channel calls which are then associated with each other to function as a single multi-channel call. Hence, the determination performed by call processing 170 is whether the (single-channel) call that is being set up is an independent call or a part of a multi-channel call that has already been set up in part. A call having the identical source and destination as another existing call is assumed to be a part of a multi-channel call, along with the existing call. Illustratively, call processing 170 examines one or more of the following information elements (IEs) of the call's ISDN SETUP message: calling party and called party address, calling party and called party subaddress, call identifier (CID), and high or low layer compatibility (HLC/LLC). Call processing then compares these IEs against the call signatures (i.e., records of call information stored by call processing) of other existing calls served by switching system 100 to determine if the IEs match any of the call signatures. If there is a match of all of the compared information, the calls are assumed to be associated. Additionally, any other information from which the caller's intent to establish a multi-channel call may be deduced may be used for this determination.

If the call is not determined at step 206 to be associated with another call, call processing 170 proceeds to route the call conventionally (e.g., on the basis of the called telephone number and independently of other calls), at step 208. If the call is determined to be associated with another call, call processing 170 notifies connection management 172 of this fact, at step 210, and routes the call associatively, that is, to the same endpoint address to which the associated call is routed, at step 212. Call processing 170 conventionally has the requisite information in the call record of the associated call. Illustratively, if the associated call terminates on a line port circuit 112, call processing 170 routes the present call to the same user identifier (UID) as the associated call, and if the associated call terminates on a trunk port circuit 150, call processing 170 routes the present call to the same generic address—either the same route pattern or the same trunk group—as the associated call. Following routing of the call at step 212, call processing 170 notifies connection management 172 of the termination selected for the call, at step 214.

Following steps 208 or 214, call processing 170 continues to process the call conventionally, at step 216, until the call terminates at step 222. Conventional processing at step 216 involves notifying connection management 172 of receipt of any call-related stimulus that affects the configuration of the call, at steps 218 and 220. Such stimulus includes invocation of a feature, such as HOLD, TRANSFER, CONFERENCE, and DROP.

Figure 3:
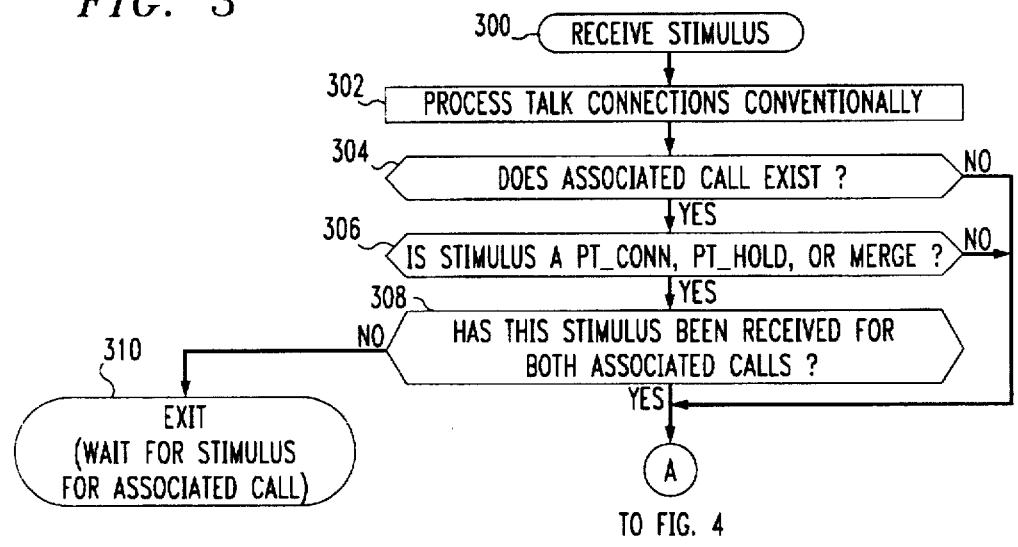
FIGS. 3–5 are a functional flow diagram of connection management of the switching system of the telecommunications system of FIG. 1.
Figure 4:
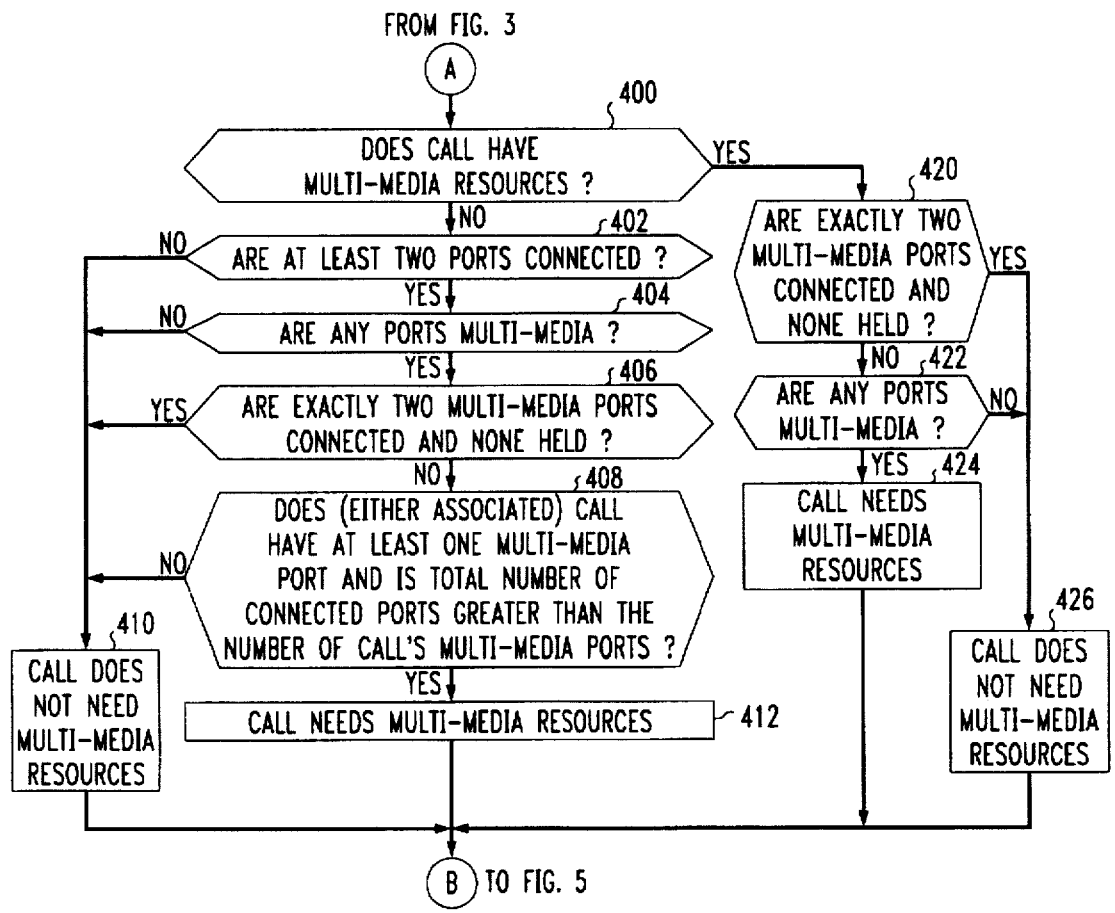
Figure 5:
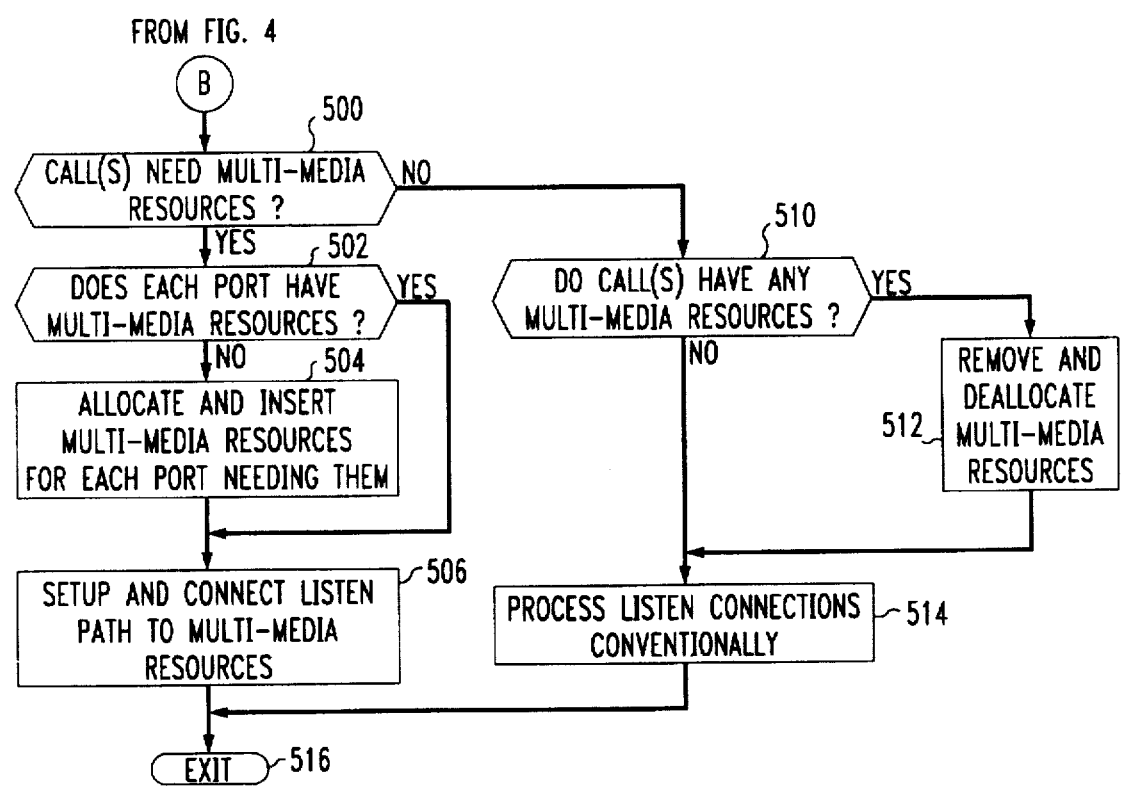
Figure 6A:
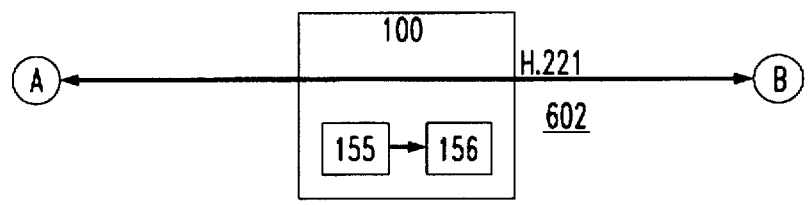
FIGS. 6–7 are a progression sequence diagram of a HOLD feature for a single-channel point-to-point video call in the telecommunications system of FIG. 1.
Figure 6B:
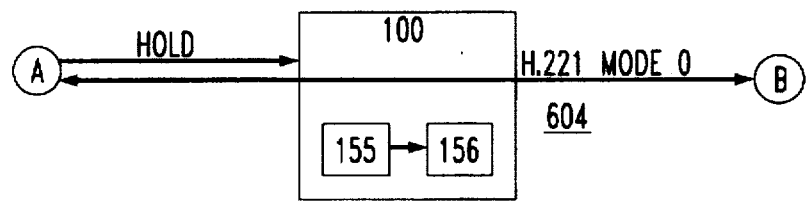
Figure 6C:
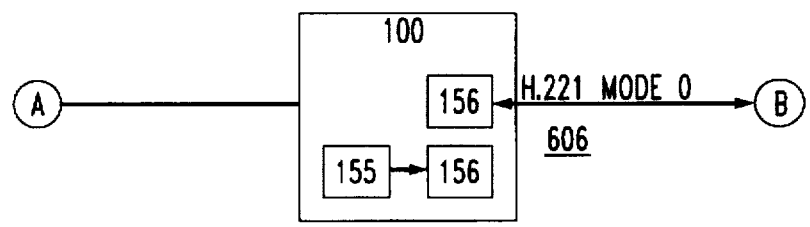
Figure 6D:
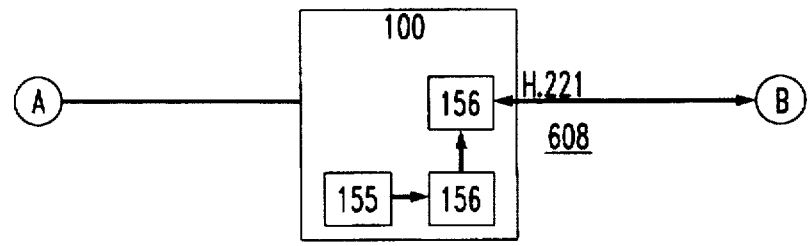

Connection management 172 is responsible for establishing whatever connections to physical resources are required by the call in switching system 100. Its operation with respect to multi-media calls is shown in FIGS. 3–5. Execution of connection management 172 is invoked when a stimulus (a notification) arrives from call processing 170, at step 300 of FIG. 3. In response, connection management 172 effects whatever connections, or changes in existing connections, are required for the talk paths of the call, in a conventional manner, at step 302, and also records the received stimulus in the call record. For example, when connection management 172 receives notification (step 201 of FIG. 2) from call processing 170 of a new call, it creates a call record for the call, enters the CID of the call and the identifier of the call-originating port 112, 119, or 150 in the call record, and assigns a talk timeslot on the TDM bus of switching fabric 140 to the originating port. When connection management 172 receives notification (step 205 and 212 of FIG. 2) from call processing 170 that the call is a multi-media call or an associated call, it merely enters this information (along with the CID of the associated call) in the call record. And when connection management 172 receives notification (step 214 of FIG. 2) of the call's termination, it enters the identifier of the call-terminating port 112, 119, or 150 in the call record, and assigns a talk timeslot on the TDM bus of switching fabric 140 to the terminating port. Having processed the talk connections affected by the received stimulus, connection management 172 now checks the call's record to determine if the call is associated with another call. If not, connection management 172 has all the stimuli it needs to process the call, and so it proceeds to FIG. 4. If the subject call is associated with another call, connection management 172 checks, at step 306, whether the stimulus received for the subject call at step 300 was any one of: a PT_CONN, indicating that a party is being added to the call; a PT_HOLD, indicating that a party to the call is being put on hold; or MERGE, indicating that two disjoint calls are being combined into one, for example, to create a conference. If the received stimulus was not one of these three stimuli, connection management 172 proceeds to FIG. 4. If the received stimulus was one of these three stimuli, connection management 172 checks the associated call—s record to determine if this stimulus has been received for both of the associated calls, at step 308. If not, connection management 172 exits processing of the subject call, at step 310, to await receipt of the same stimulus for the associated call. If this stimulus has been received for both associated calls, connection management 172 proceeds to FIG. 4.

In FIG. 4, connection management 172 determines the need for, and possession of, multi-media resources 156 by this call and any associated call or calls. Connection management 172 checks the subject call—s record to determine whether any multi-media resources 156—circuits of MMI 152 and/or VC 154—are assigned to serve this call, at step 400. (Because of steps 308–310 of FIG. 3, any associated call will be in the same state as the subject call.) If not, connection management 172 proceeds to steps 402 et seq. to determine if any multi-media resources are needed; if so, connection management 172 proceeds to steps 420 et seq. to determine if any of the assigned multi-media resources 156 are not needed.

At step 402, connection management 172 checks the call record to determine whether at least two ports 112, 119, or 150 are connected to the subject call. If not, the call does not need any multi-media resources, and connection management 172 identifies it as such at step 410, and then proceeds to FIG. 5. If at least two ports are connected to the call, connection management 117 checks the call record to determine whether any of the connected ports are multi-media ports, that is, whether the call connecting them is a multi-media call, at step 404. (This was reported by call processing 170 at step 205 of FIG. 1). If none of the call—s ports are multi-media ports, connection management 172 proceeds to step 410. If any of the call—s ports are multi-media ports, connection management 172 checks the call record to determine if exactly two multi-media ports are connected to the call and, optionally, if neither is on hold, at step 406. If so, the call is an active point-to-point multi-media call, needing no multi-media resources 156, and so connection management 172 proceeds to step 410. If the conditions of step 406 are not met, connection management 172 checks the call record to determine if the subject call or any associated call involves at least one multi-media port and the total number of ports connected by the call is greater than the number of multi-media ports involved in the call, at step 408. If not, connection management 172 proceeds to step 410. If both conditions of step 408 are met, either by the subject call or any associated call, the call is a "conversion" call—one wherein at least one party to a multi-media call is not connected to the call by a multi-media port, as a consequence of which conversion between the multi-media and single-media (voice) communication domains must be performed. Conversion requires the use of multi-media resources 156, so connection management 172 identifies the subject call as needing multi-media resources 156, at step 412, and then proceeds to FIG. 5.

Returning to step 400, if the subject call is found there to have multi-media resources 156 assigned to it, connection management 172 checks the call record to determine if exactly two multi-media ports are connected to the call and, optionally, if neither is on hold, at step 420. If so, the call is an active point-to-point multi-media call, needing no multi-media resources 156, and so connection management 172 identifies it as such at step 426, and then proceeds to FIG. 5. If the conditions of step 406 are not met, connection management 172 checks the call record to determine whether any of the ports that are connected to the call are multi-media ports, at step 422. If not, connection management 172 proceeds to step 426. If any of the call—s ports are multi-media ports, the call needs multi-media resources 156, and connection management 172 identifies it as such at step 424, and then proceeds to FIG. 5.

In FIG. 5, connection management 172 provides any needed but lacking multi-media resources 156 to the subject call and any associated calls, and removes any assigned but not needed multi-media resources 156 from the subject call and any associated calls. Connection management 172 first checks whether the subject call has been determined, at step 412 or 424 of FIG. 4, to need multi-media resources, at step 500. If so, connection management 172 checks whether every port involved in the subject call or any associated call has multi-media resources 156 assigned to it, at step 502. If not, connection management 172 causes MMI 152 and/or VC 154 to allocate some of their circuits to each port that needs them, and inserts the allocated multi-media resources 156 into the talk paths, at step 504. Circuits of both MMI 152 and VC 154 are assigned to multi-media ports, but only circuits of VC 154 are assigned to single-media ports at step

504. A record of the assignment is made in the call record of each affected call. Insertion of the allocated multi-media resources into the talk paths involves disconnecting the receiving ends of the talk paths from each call—s originating and terminating port circuits and reconnecting them to the allocated set of MMI 152 and VC 154 circuits. Following step 504, or if it is determined at step 502 that each port has multi-media resources 156, connection management 172 sets up listen paths for the subject call and any associated calls and connects the transmit ends of the listen paths to the allocated set of MMI 152 and VC 154 circuits, at step 506. Illustratively, setting up listen paths involves assigning listen timeslots on the TDM bus of switching fabric 140 to each of the originating and terminating port circuits of the call, and connecting the listen paths to the allocated resources 156 involves assigning the just-assigned listen timeslots as talk timeslots to the set of MMI 152 and VC 154 circuits that have been allocated to the call. Processing of the stimulus that invoked execution of connection management 172 at step 300 of FIG. 3 then ends, at step 516.

Returning to step 500, if it is determined there that the subject call and any associated calls do not need multi-media resources 156, connection management 172 checks the call records to determine whether the subject call or any associated calls have any assigned multi-media resources 156, at step 510. If either the subject call or any associated calls have assigned multi-media resources 156, connection management 172 removes these multi-media resources 156 from those calls and causes MMI 152 and/or VC 154 to deallocate these multi-media resources 156 from those calls, at step 512. For each call, this involves disconnecting the receiving end of the call—s talk path from the allocated set of MMI 152 and VC 154 circuits and tearing down the call—s listen path that was connected to the allocated set of MMI 152 and VC 154 circuits. Tearing down a call—s listen path illustratively involves deallocating from the call the call—s assigned listen timeslot on the TDM bus of switching fabric 140. Each call now has only a talk path but no listen path.

Following step 512, or if neither the subject call nor any associated call is found at step 510 to have assigned multi-media resources 156, connection management 172 engages in conventional processing to effect the necessary connections for the listen path of each call, at step 514. For example, this may involve assigning the talk timeslot of the call—s originating port circuit as the listen timeslot of the call—s terminating port circuit, and assigning the talk timeslot of the call—s terminating port circuit as the listen timeslot of the call—s originating port circuit. Processing of the stimulus that invoked execution of connection management 172 at step 300 of FIG. 3 then ends, at step 516.

It will now be illustrated how the above-described mechanisms and their functionality are used to implement the telecommunications features of "hold", "transfer", "conference", and "drop" for video (multi-media) calls.

Assume that a single-channel point-to-point video call exists between two video terminals A and B through switching system 100, as shown at view 602 in FIG. 6. Both video terminals may be served directly by switching system 100 (i.e., both may be included among video terminals 102–104 in FIG. 1), or one of the video terminals may be remote (i.e., one of the video terminals may be included among video terminals 106–108 in FIG. 1). The H.221 protocol exists end-to-end on the call connection (an ISDN B channel, in this illustrative example) between terminals A and B; the protocol is not terminated at switching system 100. This call can be placed on hold by either terminal A or B. Assume that terminal A is placing the call on hold. Terminal A instructs terminal B to freeze the present image transmission on the call and "mode-0 forces" the call (i.e., forces both terminals on the call into a basic, PCM voice-only, mode of communication) by communicating with terminal B via the call in a conventional (H.320) manner. Terminal A then sends a "HOLD" message for the call to switching system 100, illustratively over the ISDN D channel that is associated with the call—s B channel. The call now has the form shown at view 604 in FIG. 6. In response to the "HOLD" message, switching system 100 (and more specifically, connection management 172 of switching system 100) disconnects the call (i.e., disconnects the listen and talk call paths of the call) from terminal A and reconnects the call to a set of multi-media resources 156 that have been allocated to the call. The multi-media resources 156 terminate the H.221 protocol at switching system 100 and keep the H.221 protocol up and running on the call—s path to terminal B. The call is now on hold and has the form shown at view 606 in FIG. 6.

Optionally, if video-on-hold (akin to standard telephony's music-on hold) is provided by switching system 100 to single-channel video calls, switching system 100 has a service circuit 155 that is a source of a single-channel video program. Service circuit 155 is permanently connected to an associated set multi-media resources 156. Switching system 100 causes the call—s set of multi-media resources 156 to upgrade the call from the zero mode to a video transmission mode of service circuit 155, in a conventional manner, and connects the service circuit's set of multi-media resources 156 to the call—s multi-media resources 156 to supply the video-on-hold to terminal B. The call now has the form shown at view 608 of FIG. 6.

Figure 7A:
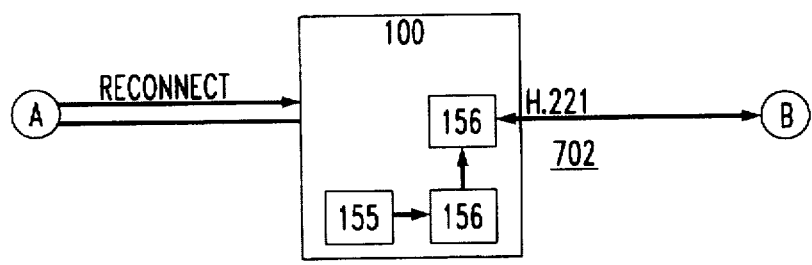
Figure 7B:
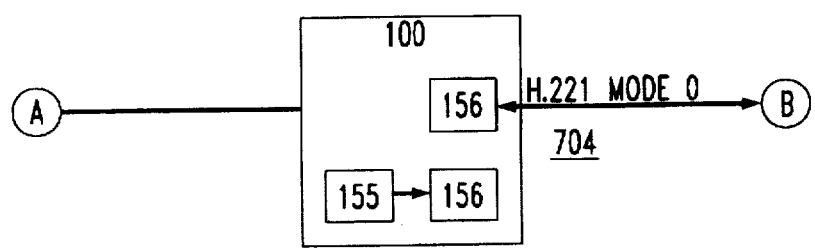
Figure 7C:
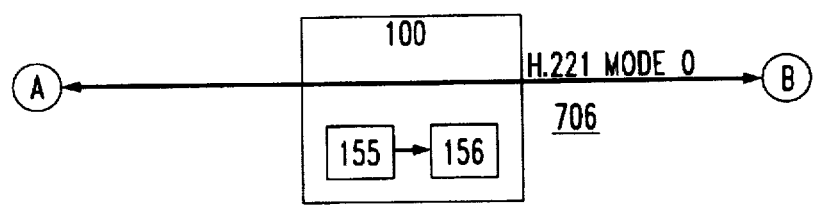
Figure 8A:
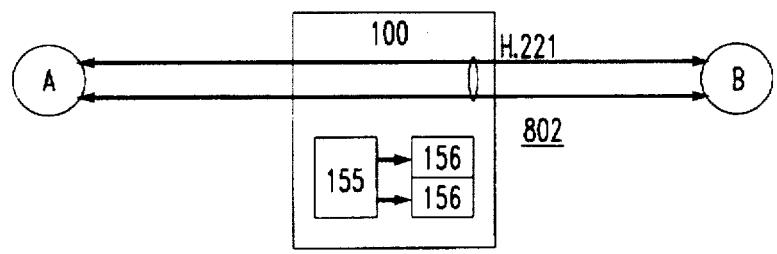
FIGS. 8–9 are a progression sequence diagram of the HOLD feature for a multi-channel point-to-point video call in the telecommunications system of FIG. 1.
Figure 8B:
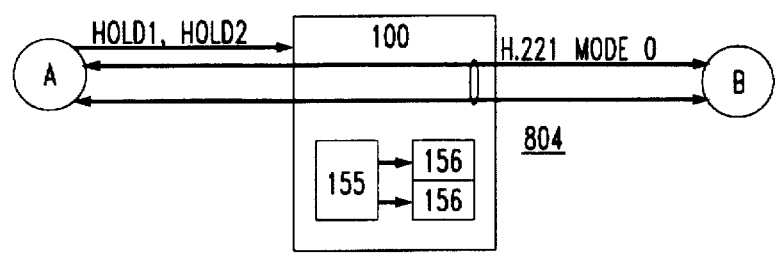
Figure 8C:
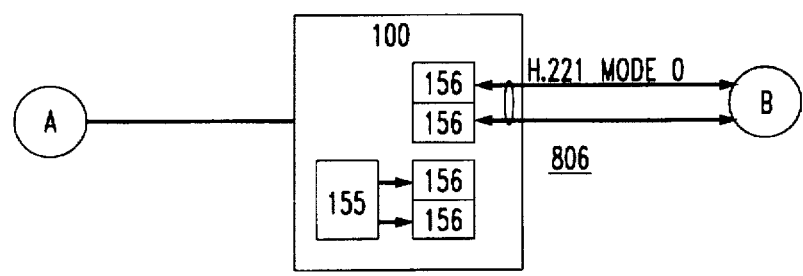
Figure 8D:
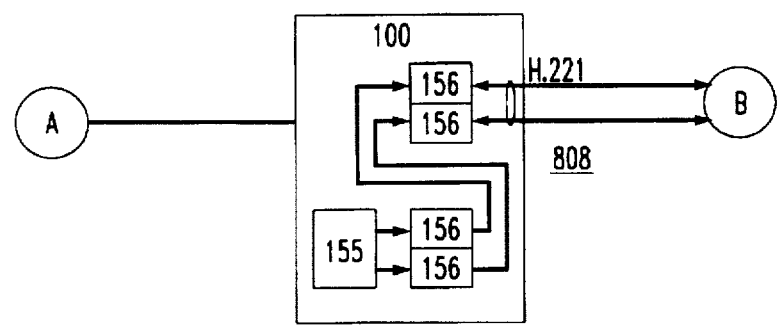

To take the call off-hold, terminal A sends a "RECONNECT" message for the call to switching system 100 (via the ISDN D channel). This is illustrated at view 702 in FIG. 7. In response, switching system 100 causes the call—s set of multi-media resources to freeze video transmission on the call and to "mode-0 force" the call, and disconnects the video-on-hold service circuit's set of multi-media resources 156 from the call—s set of multi-media resources 156. The call now has the form shown at view 704 of FIG. 7. If video-on-hold had not been provided to terminal B, the "RECONNECT" message from terminal A would have been received while the call had the form shown at view 704. Switching system 100 now disconnects the call from its set of multi-media resources 156 and deallocates those resources 156 from the call, and reconnects the call to terminal A. The call now has the form shown at view 706 in FIG. 7. Terminals A and B may now upgrade the call from the zero mode back to a video transmission mode in a conventional manner.

The hold processing for a multi-channel point-to-point video call is very similar to that just described for a single-channel video call. Assume that a multi-channel point-to-point video call exists between two video terminals A and B, as shown at view 802 in FIG. 8, and that terminal A is placing the call on hold. Terminal A instructs terminal B to freeze the present image transmission on the collection of channels of the call and "mode-0 forces" the collection of channels of the call, in a conventional manner. Terminal A then sends a "HOLD" message for each channel of the call to switching system 100 (via the ISDN D channel). The call now has the form shown at view 804 in FIG. 8. In response to receipt of the "HOLD" message for each of the call—s channels, switching system 100 disconnects each channel from terminal A. When both "HOLD" messages are received, switching system 100 reconnects each channel of the call to a separate set of multi-media resources 156 that have been allocated to the call. The call is now on hold and has the form shown at view 806 in FIG. 8.

Again optionally, if video-on-hold is provided by switching systems 100 to multi-channel video calls, switching system 100 has a service circuit 155 that is a source of a multi-channel video program. Service circuit 155 is permanently connected to multiple sets of multi-media resources 156, one for each channel. Switching system 100 causes the call—s sets of multi-media resources 156 to upgrade the call from the zero mode to a video transmission mode of service circuit 155, in a conventional manner, and connects the service circuit's sets of multi-media resources 156 to the call—s sets of multi-media resources 156 to supply the multi-channel video-on-hold to terminal B. The call now has the form shown at view 808 in FIG. 8.

Figure 9A:
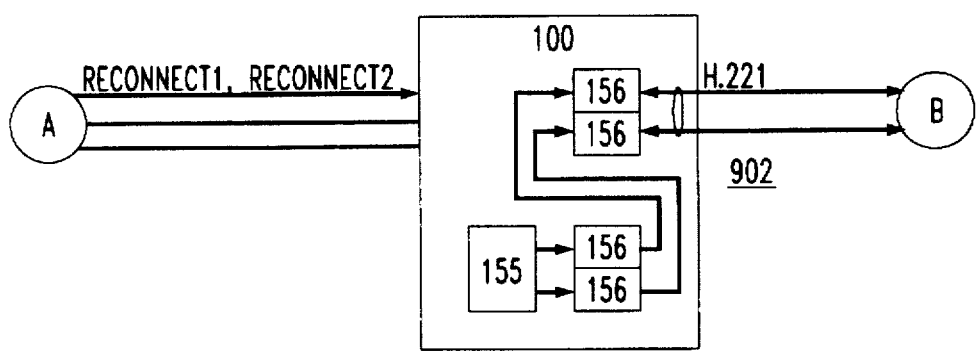
Figure 9B:
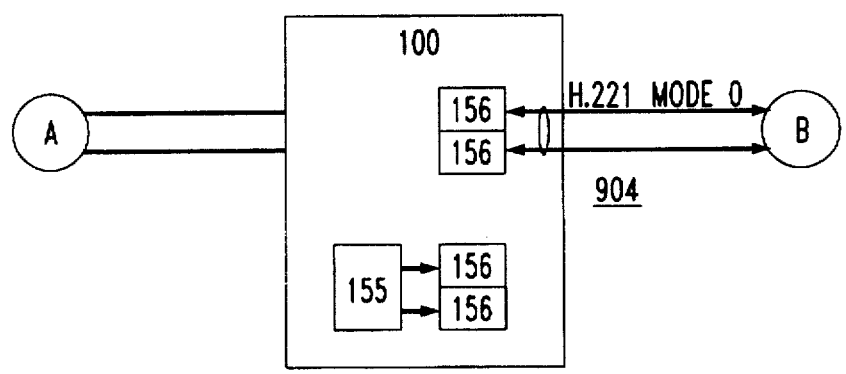
Figure 9C:
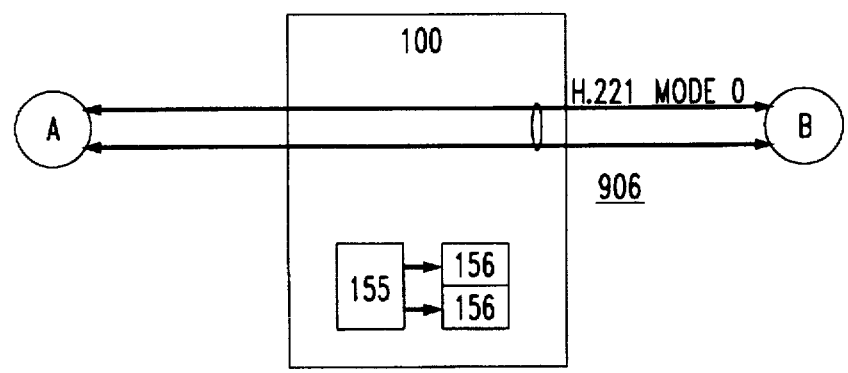
Figure 10A:
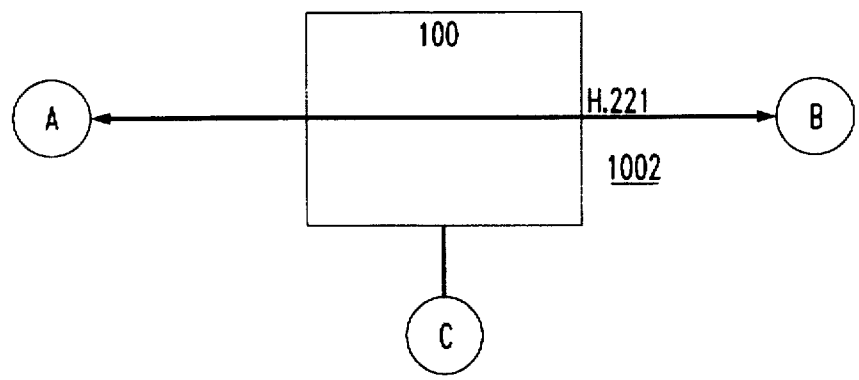
FIG. 10 is a progression sequence diagram of a CONFERENCE feature for a single-channel video call in the telecommunications system of FIG. 1.
Figure 10B:
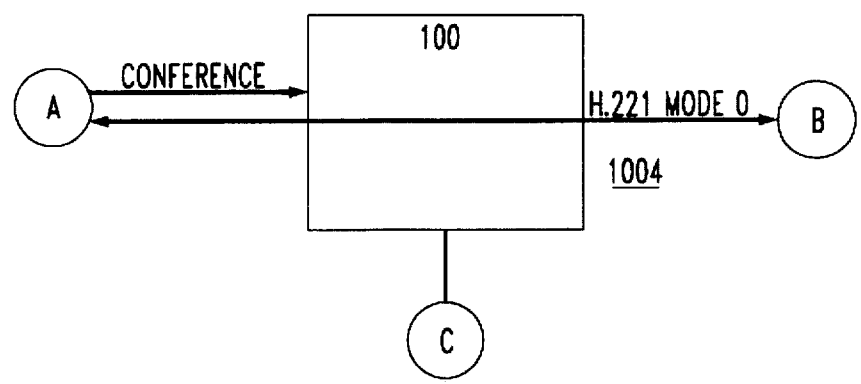
Figure 10C:
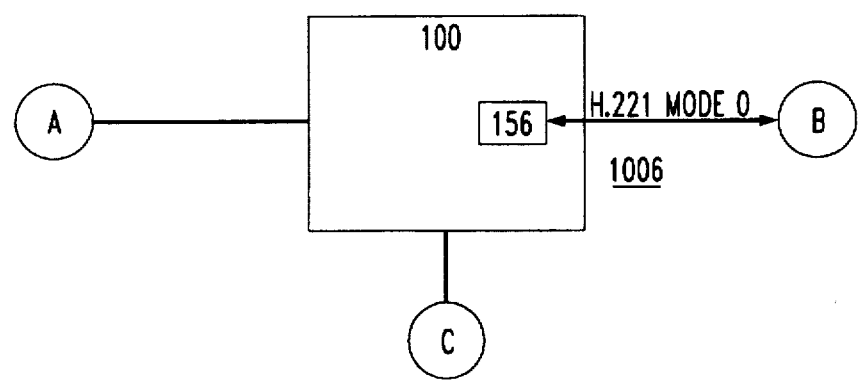
Figure 10D:
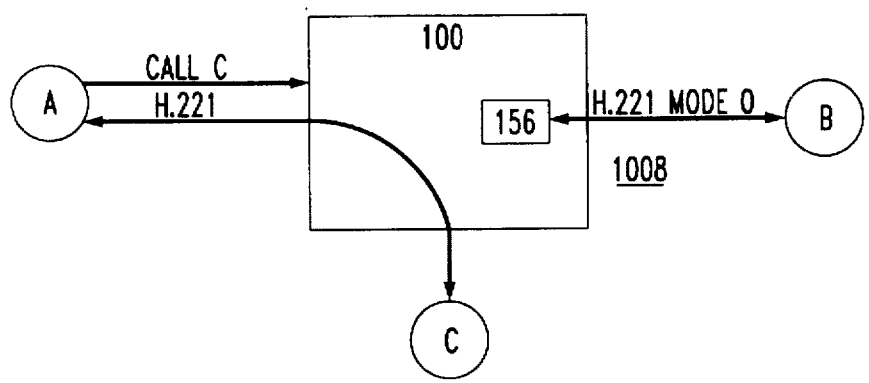
Figure 10E:
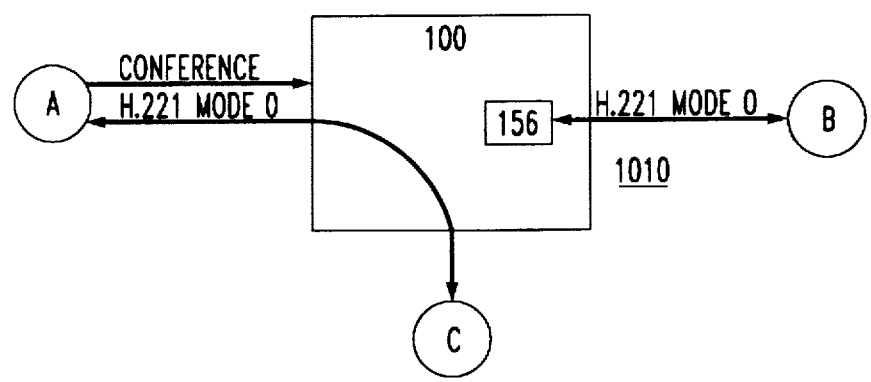
Figure 10F:
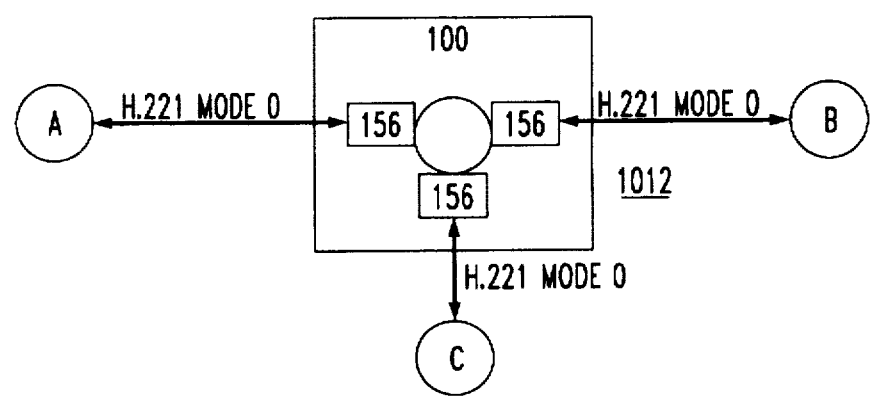
Figure 11A:
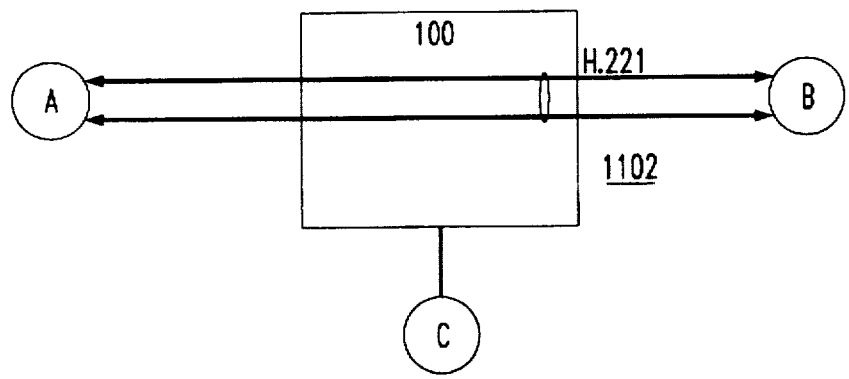
FIG. 11 is a progression sequence diagram of the CONFERENCE feature for a multi-channel video call in the telecommunications system of FIG. 1.
Figure 11B:
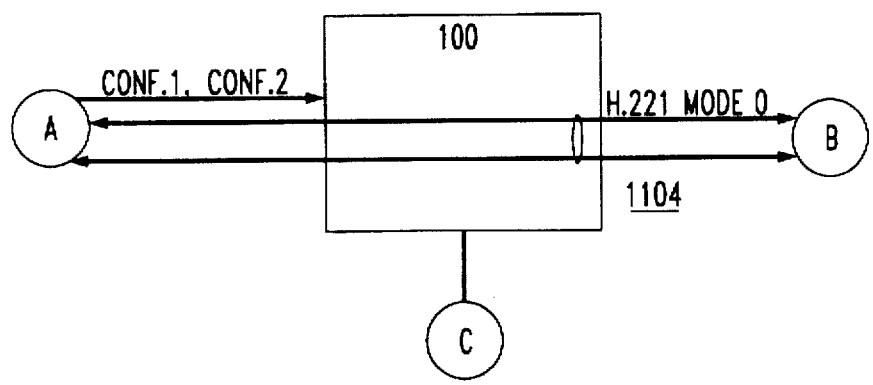
Figure 11C:
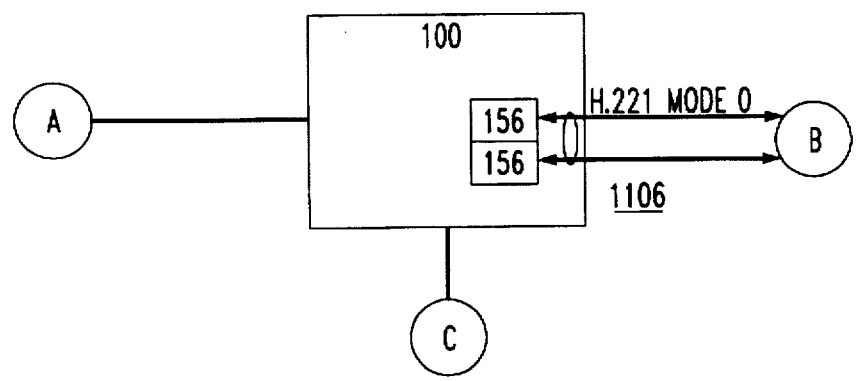
Figure 11D:
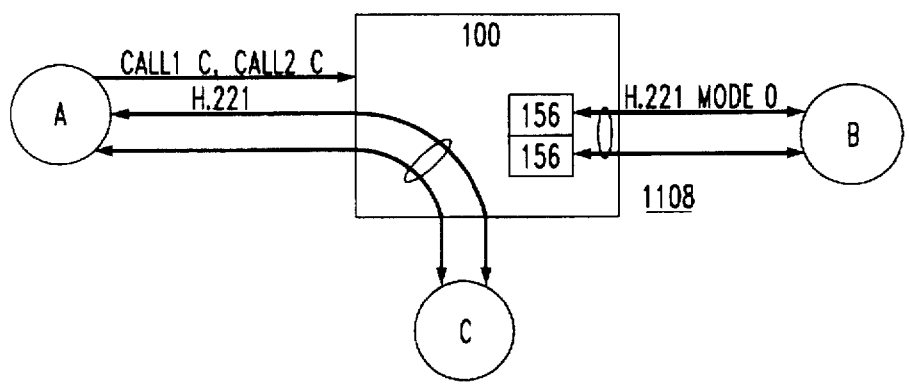
Figure 11E:
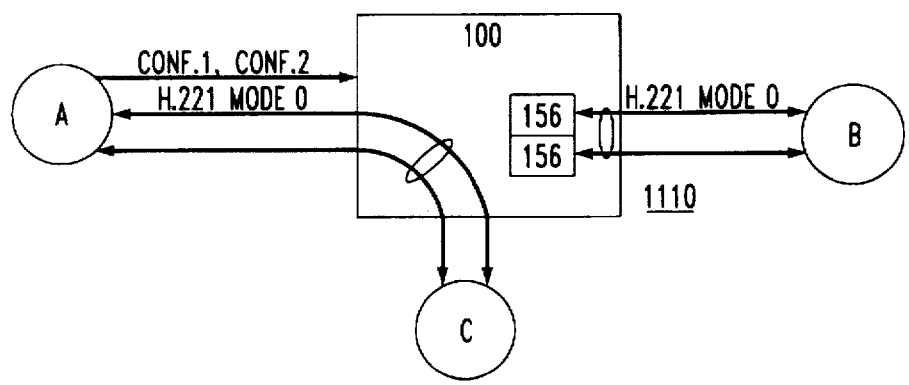
Figure 11F:
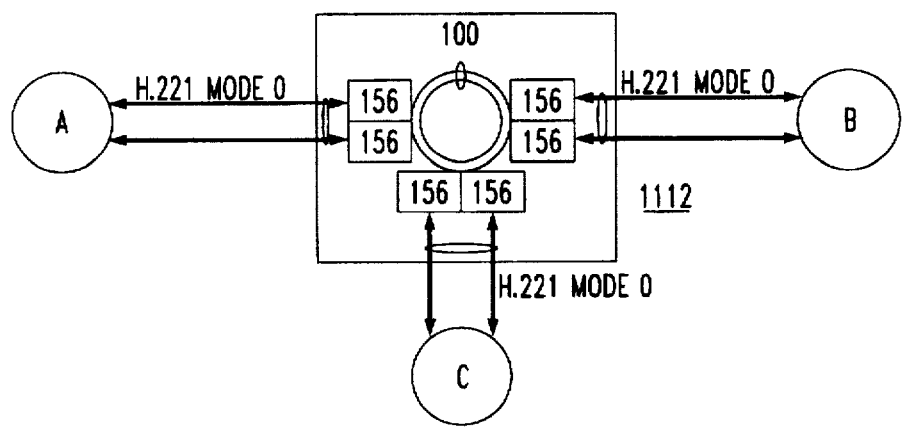

To take the call off-hold, terminal A sends a "RECONNECT" message for each of the call—s channels to switching system 100 (via the ISDN D channel). This is illustrated at view 902 in FIG. 9. In response to receiving the "RECONNECT" messages for all of the channels, switching system 100 causes the call—s sets of multi-media resources 156 to freeze video transmission on the call and to "mode-0 force" the call, and disconnects the video-on-hold service circuit's sets of multi-media resources 156 from the call—s sets of multi-media resources 156. The call now has the form shown at view 904 of FIG. 9. If video-on-hold had not been provided to terminal B, the "RECONNECT" messages from terminal A would have been received while the call had the form shown at view 904. Switching system 100 now disconnects the call from its sets of multi-media resources 156 and deallocates those sets of resources 156 from the call, and reconnects the call to terminal A. Terminal A now resumes the multi-channel call in the manner specified in the ETSI 300-145 standard. The call now has the form shown at view 906 in FIG. 9. Terminals A & B may now upgrade the call from the zero mode back to a video transmission mode in a conventional manner.

A single-channel video conference call is established from an existing single-channel point-to-point call by first putting the existing call on hold. This is shown by views 1002–1006 of FIG. 10, where the only difference from views 602–604 of FIG. 6 is that terminal A which is establishing the conference sends a "CONFERENCE" message instead of a "HOLD" message in view 1004. Having put the existing call on hold, terminal A now places a second multi-media single-channel call to a third video terminal C, and switching system 100 establishes the second call, all in a conventional manner. This is shown by view 1008 in FIG. 10. Like terminals A and B, terminal C may be either one of the terminals 102–104 or one of the terminals 106–108 in FIG. 1. Terminal A then instructs terminal C to freeze the present image transmission on the second call and "mode-0 forces" the second call, in a conventional manner, and also sends a second "CONFERENCE" message for the second call to switching system 100. The calls now have the form shown by view 1010 in FIG. 10. In response to the second "CONFERENCE" message, call processing 170 of switching system 100 conventionally merges the two calls into one (combining their separate call records into one as part of the process). As a consequence of the merging of the two calls, the resultant call has more than two parties. In response (see step 310 of FIG. 3), connection management 172 of switching system 100 causes multi-media resources 156 to be allocated to each call end of the second call, and connects the two ends of the second call to the allocated resources (see steps 502–506 of FIG. 5). MMI 152 internally interconnects the resources 156 that are allocated to the three ends of the merged call in its own conventional manner. Optionally, if the terminals A, B, and C do not have the capability of initiating an H.320 capability (CAP) exchange on their own, connection management 172 also causes MMI 152 to initiate a CAP exchange with each of the terminals A, B, and C. The call is now a conference call and has the form shown in view 1012 of FIG. 10. The conferenced terminals A, B, and C may now upgrade the mode-zero conference to a video transmission mode, in a conventional manner.

A multi-channel video conference call is established from an existing point-to-point multi-channel call by first putting the existing call on hold. This is shown by views 1102–1106 of FIG. 11, where the only difference from views 802–804 of FIG. 8 is that terminal A which is establishing the conference sends "CONFERENCE" messages instead of "HOLD" messages for each channel of the call in view 1104. Terminal A now places two multi-media single-channel calls to video terminal C, and switching system 100 establishes the two calls as associated calls. This is shown by view 1108 in FIG. 11. Terminal A then freezes video transmission on both of the associated calls and "mode-0 forces" the associated calls, and also send a second "CONFERENCE" message for each of the channels of the second call to switching system 100. The calls now have the form shown by view 1110 of FIG. 11. In response to the second "CONFERENCE" messages, switching system 100 merges each of the associated calls with a different one channel of the held call, causes multi-media resources 156 to be allocated to each call end of each of the associated calls, and connects the two ends of each associated call to their allocated resources 156. MMI 152 internally interconnects the resources 156 that are allocated to the three ends of each of the associated merged calls in its own conventional manner. The call is now a conference call and has the form shown in view 1112 of FIG. 11.

Figure 12A:
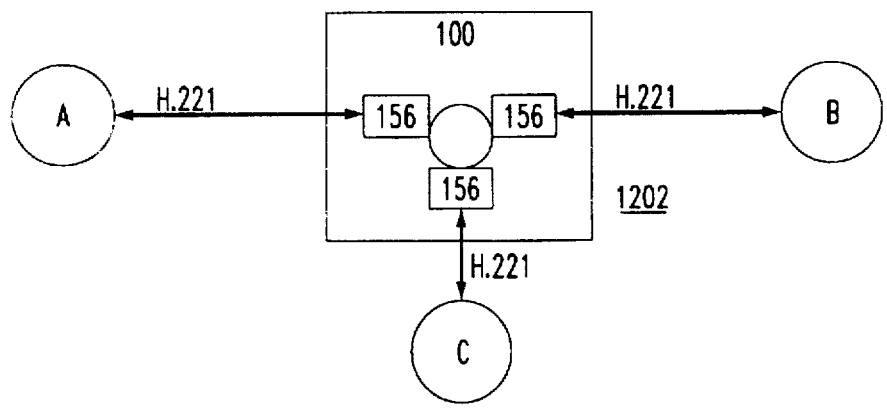
FIGS. 12–13 are a progression sequence diagram of the HOLD feature for a single-channel conference video call in the telecommunications system of FIG. 1.
Figure 12B:
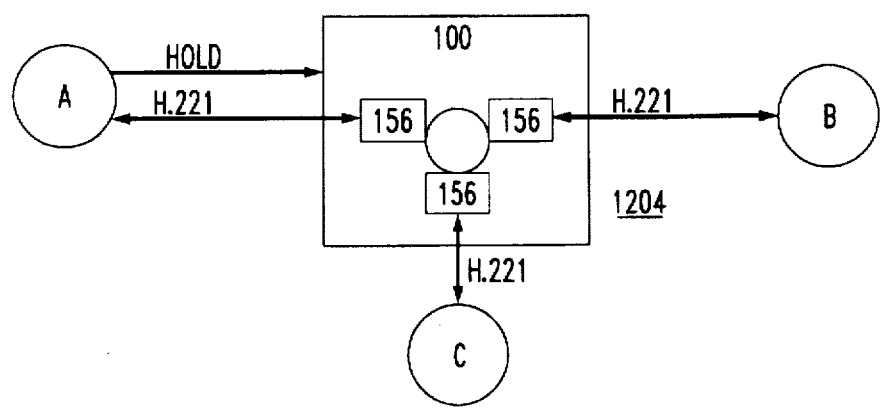
Figure 12C:
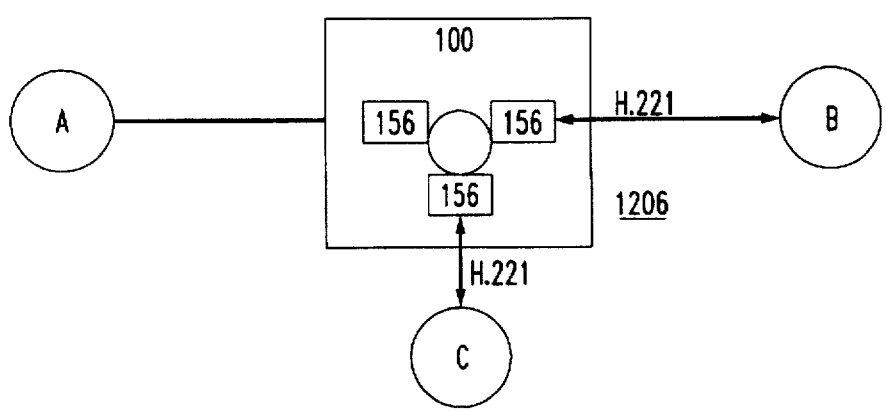

A participant to a video conference call can place the video conference on hold, whereby that participant is temporarily disconnected from the conference and the conference continues without that participant. Assuming the existence of a single-channel conference call, shown in view 1202 of FIG. 12, terminal A places the conference on hold by sending a "HOLD" message for the conference to switching system 100 (over the ISDN D channel), as shown in view 1204 of FIG. 12. In response, switching system 100 (specifically connection management 172) disconnects terminal A from the multi-media resources 156 that are allocated to this terminal's end of the conference call. Illustratively, connection management 172 effects this disconnection by requesting MMI 152 to cease transmission in both directions from the multi-media resources 156 that are allocated to terminal A's end of the call. In other words the multi-media resources 156 that are allocated to terminal A's end of the call are caused to cease transmitting both to the port circuit of terminal A and to the multi-media resources 156 that are allocated to terminal B's and terminal C's ends of the call. The call now has the form shown in view 1206 of FIG. 12.

Figure 13A:
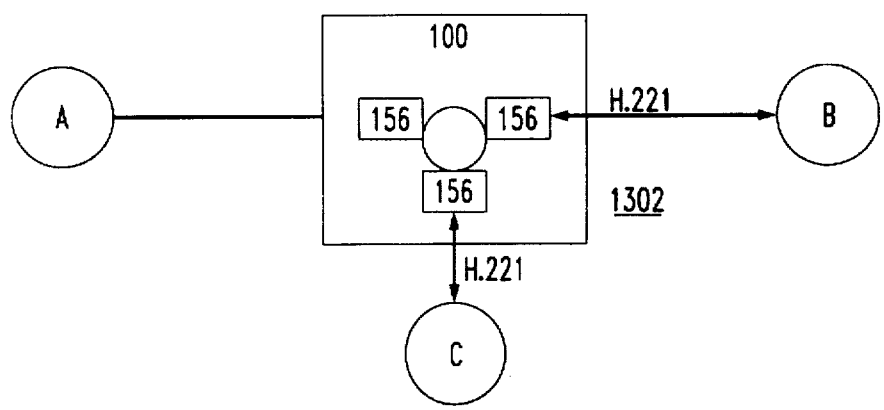
Figure 13B:
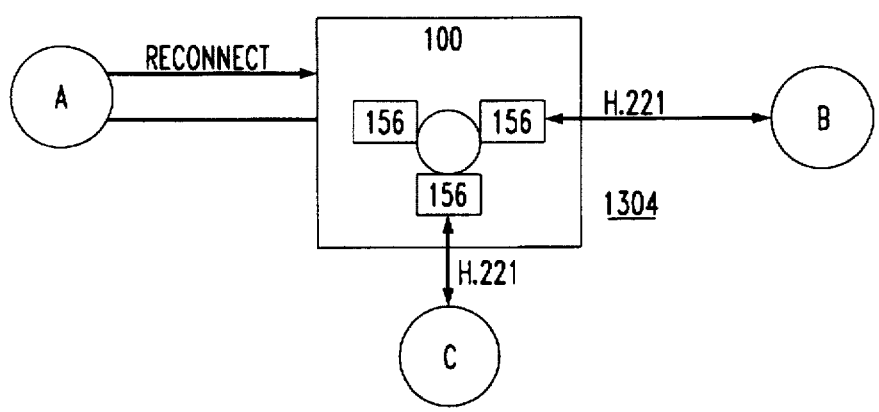
Figure 13C:
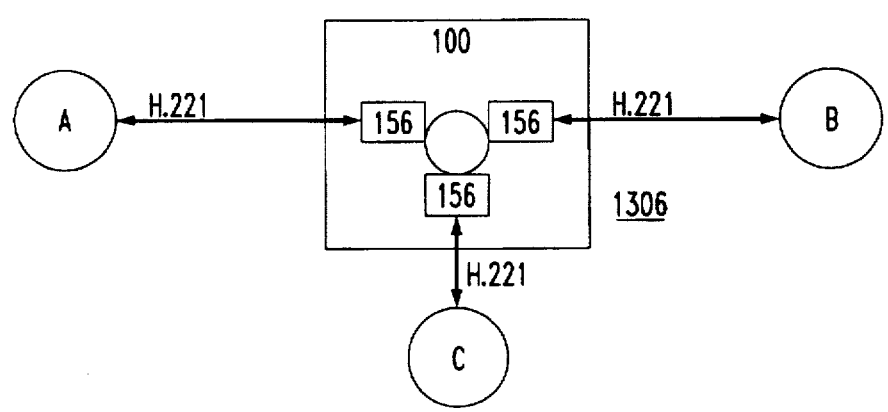

While it has a conference on hold, as shown in view 1302 of FIG. 13, terminal A can take the conference off-hold and rejoin the conference. To do so for a single-channel conference call, terminal A sends a "RECONNECT" message for the conference call to switching system 100 (via the ISDN D channel), as shown in view 1304 of FIG. 13. In response, switching system 100 (specifically connection management 172) reconnects terminal A to the multi-media resources 156 that are allocated to this terminal's end of the call. Again illustratively, connection management 172 effects this reconnection by requesting MMI 152 to commence transmission in both directions from the multi-media resources 156 that are allocated to terminal A's end of the call, and to do so in whatever transmission mode the conference call is at this time. In other words, the multi-media resources 156 that are allocated to terminal A's end of the call are caused to commence transmitting both to the port circuit of terminal A and to the multi-media resources 156 that are allocated to terminal B's and terminal C's ends of the call. The call now has the form shown in view 1306 of FIG. 13.

Figure 14A:
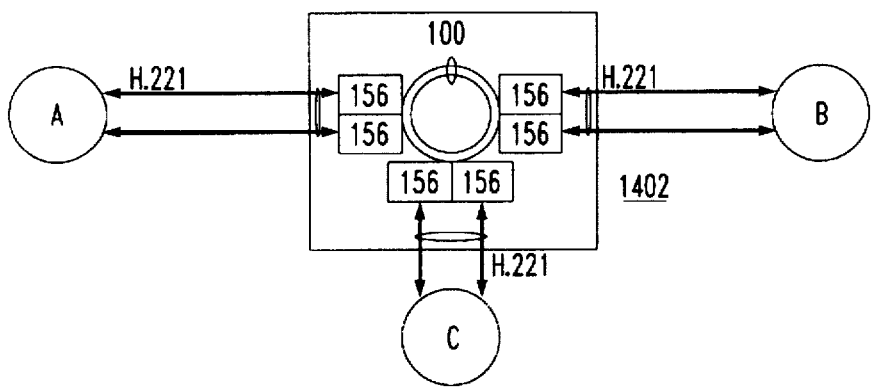
FIGS. 14–15 are a progression sequence diagram of the HOLD feature for a multi-channel conference video call in the telecommunications system of FIG. 1.
Figure 14B:
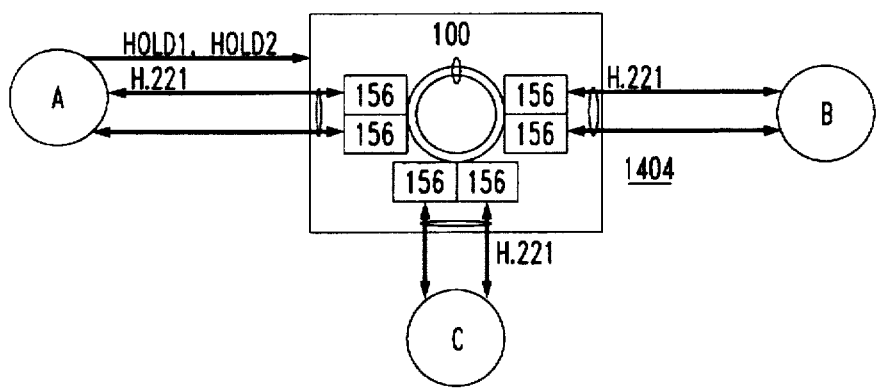
Figure 14C:
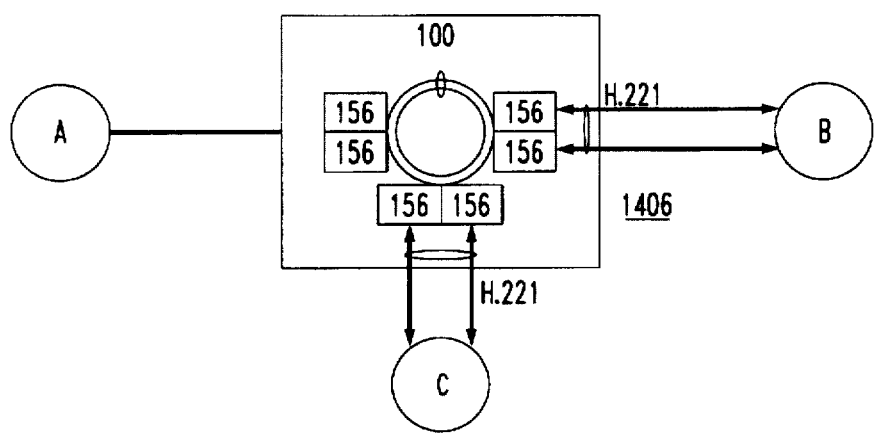
Figure 15A:
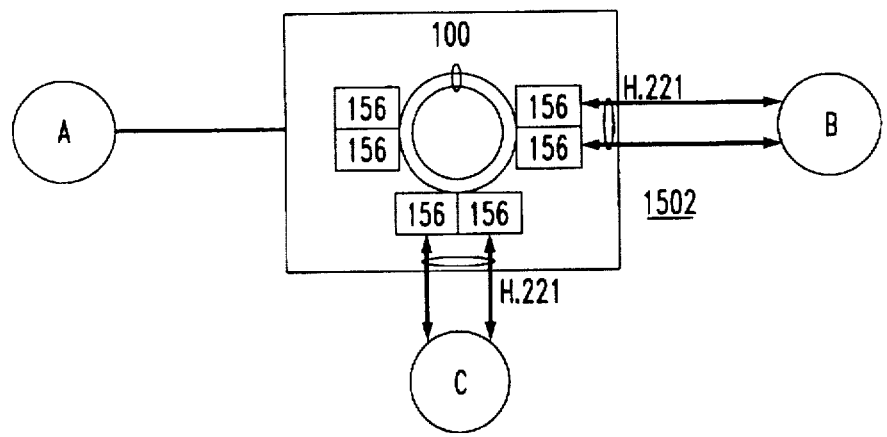
Figure 15B:
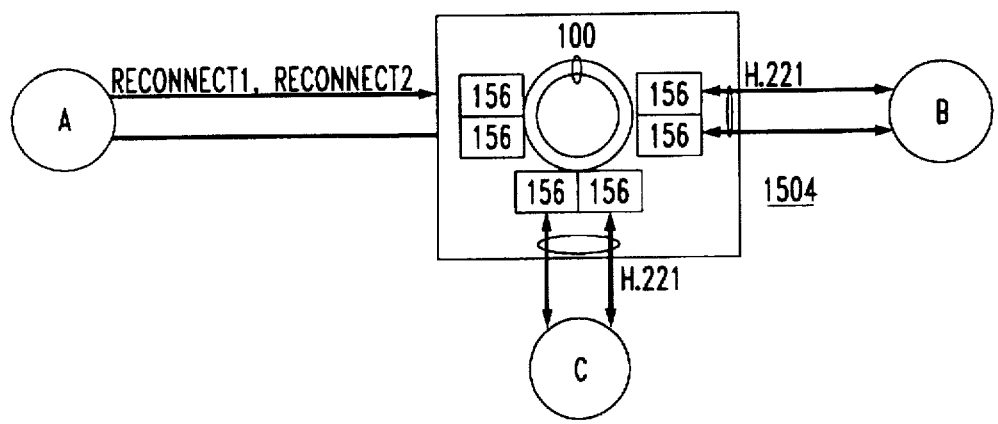
Figure 15C:
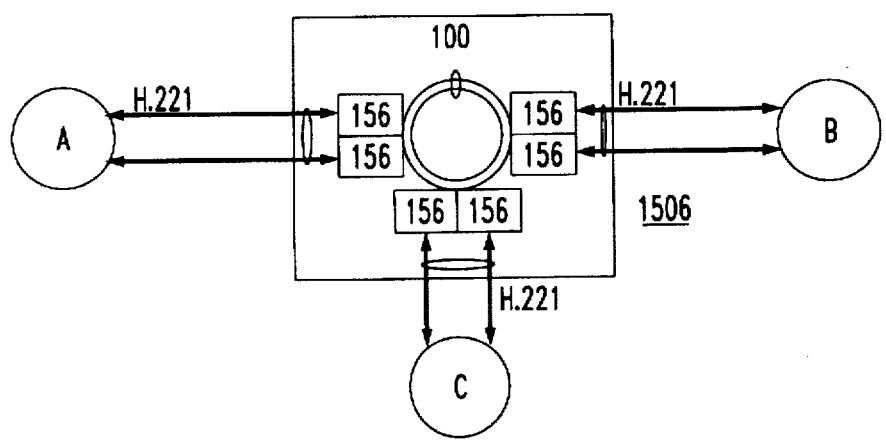
Figure 16A:
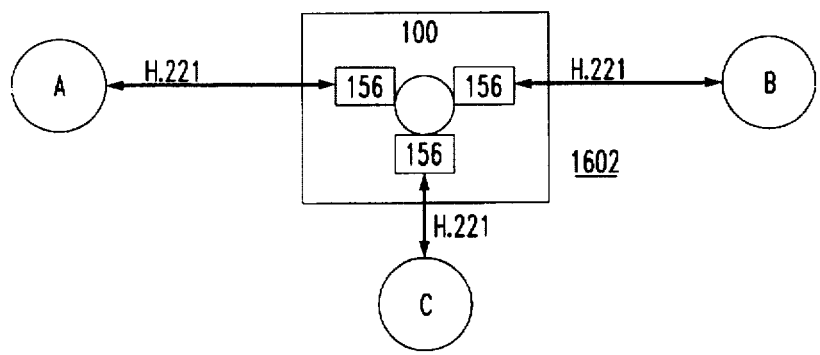
FIG. 16 is a progression sequence diagram of a conferee DISCONNECT feature for a single-channel conference video call in the telecommunications system of FIG. 1.
Figure 16B:
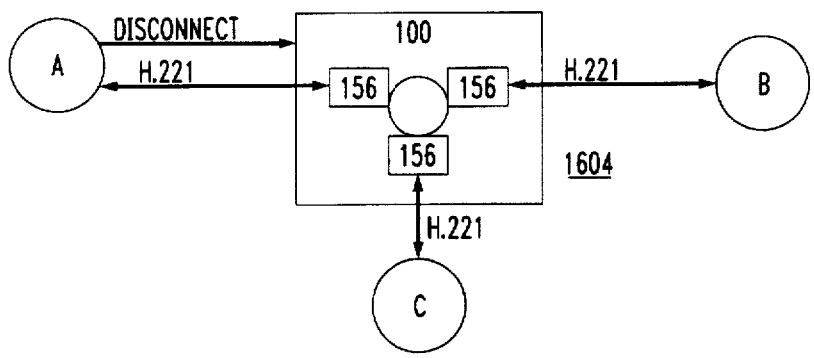
Figure 16C:
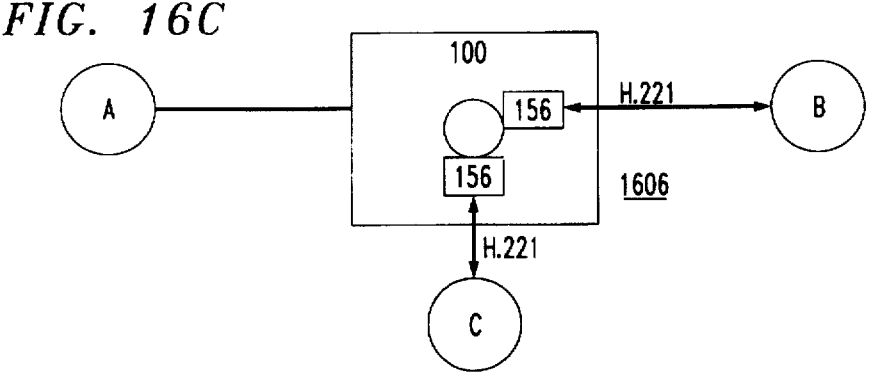
Figure 16D:
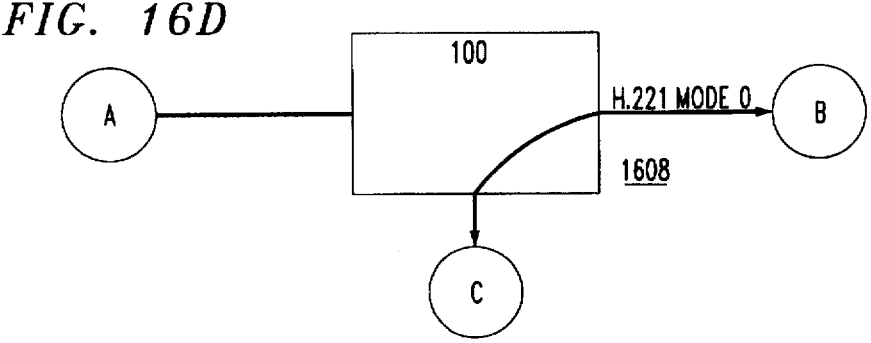
Figure 17A:
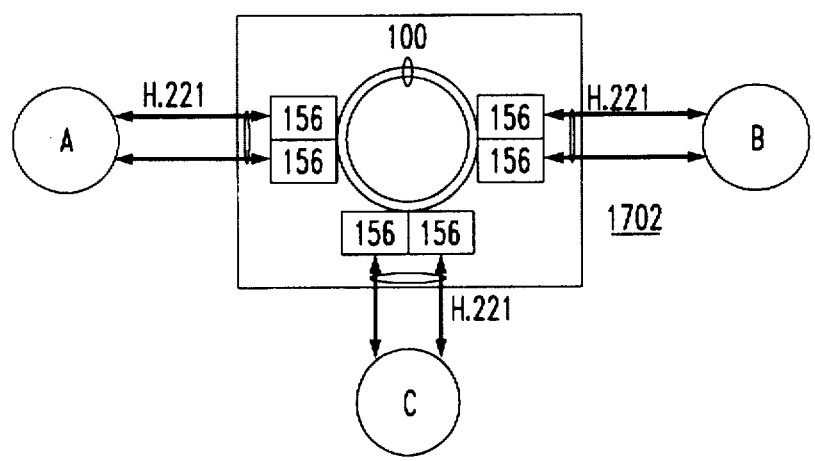
FIG. 17 is a progression sequence diagram of the conferee DISCONNECT feature for a multi-channel conference video call in the telecommunications system of FIG. 1.
Figure 17B:
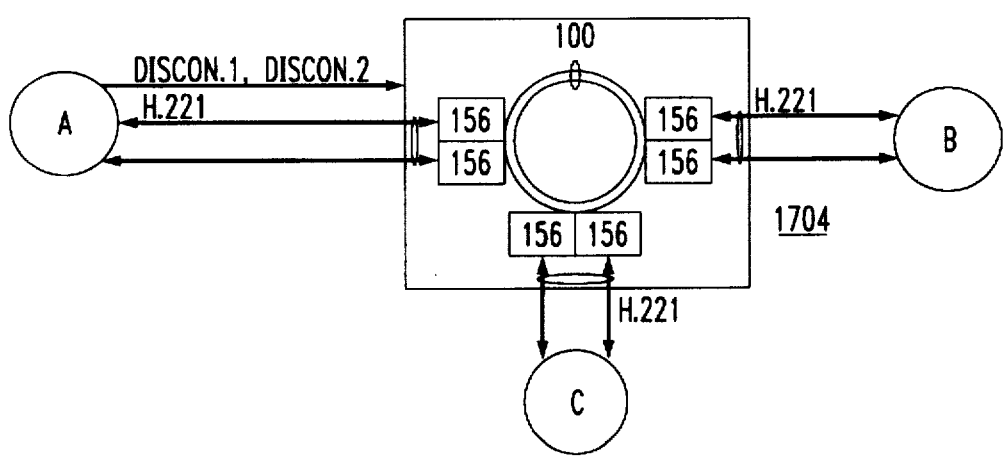
Figure 17C:
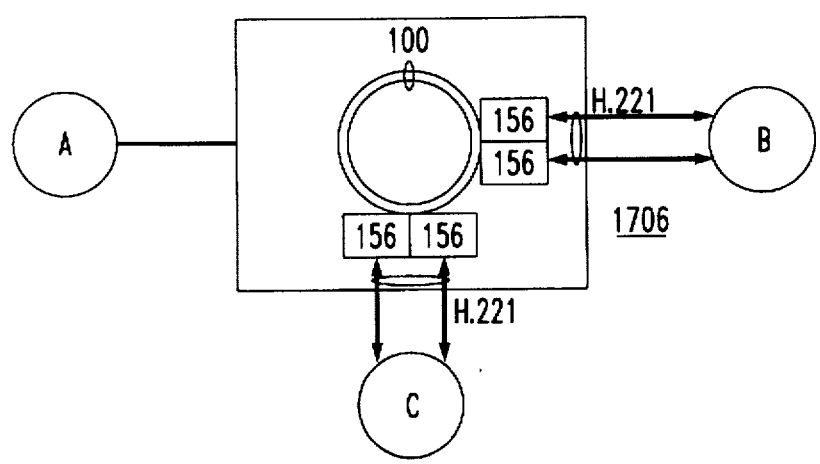
Figure 17D:
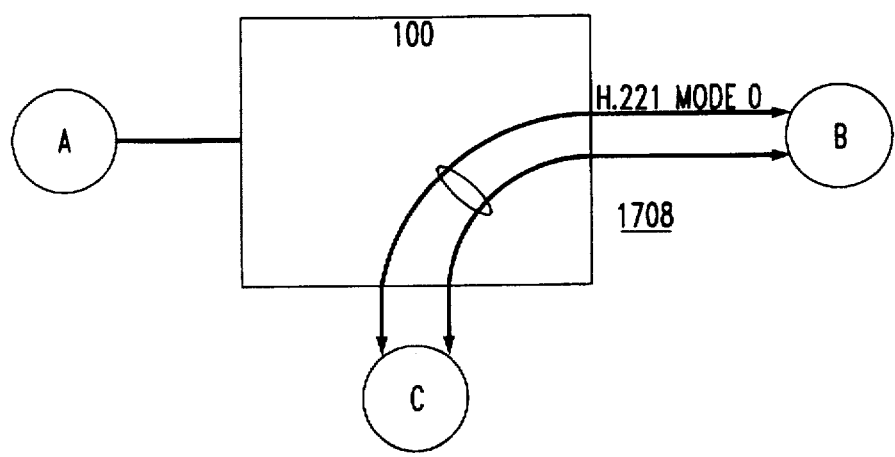
Figure 18A:
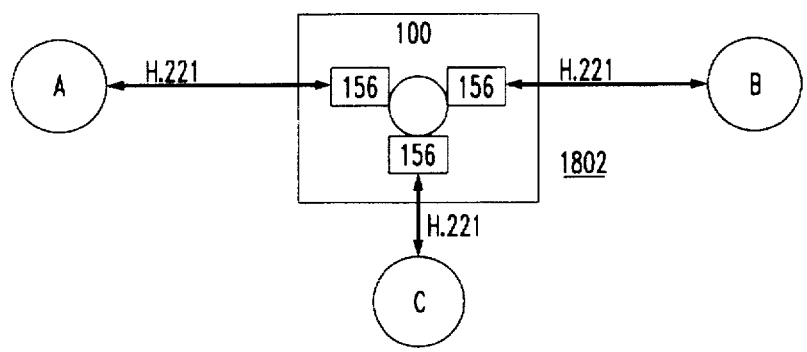
FIG. 18 is a progression sequence diagram of a conferee DROP feature for a single-channel conference video call in the telecommunications system of FIG. 1.
Figure 18B:
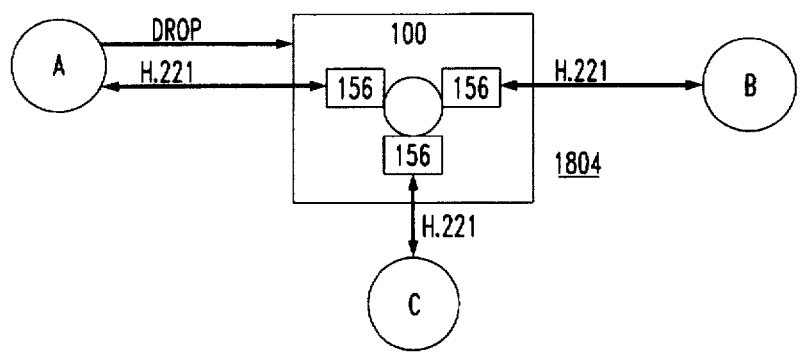
Figure 18C:
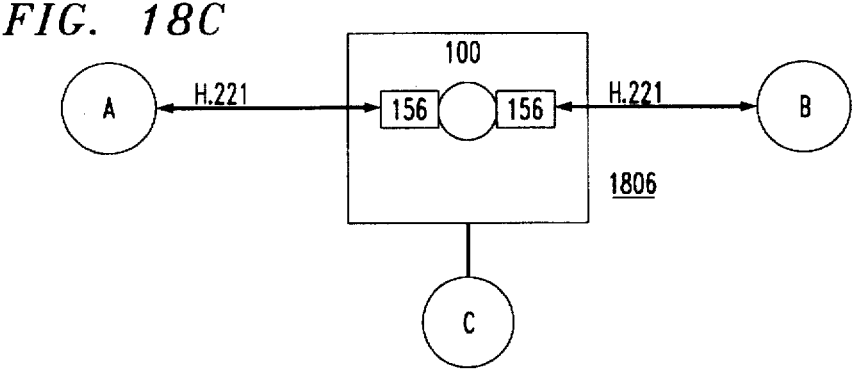
Figure 18D:
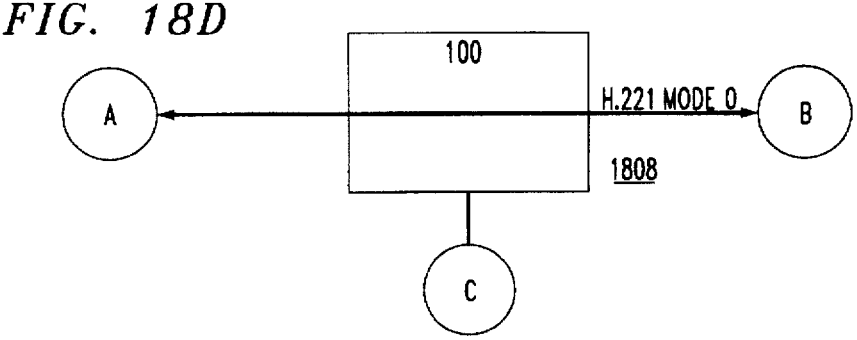
Figure 19A:
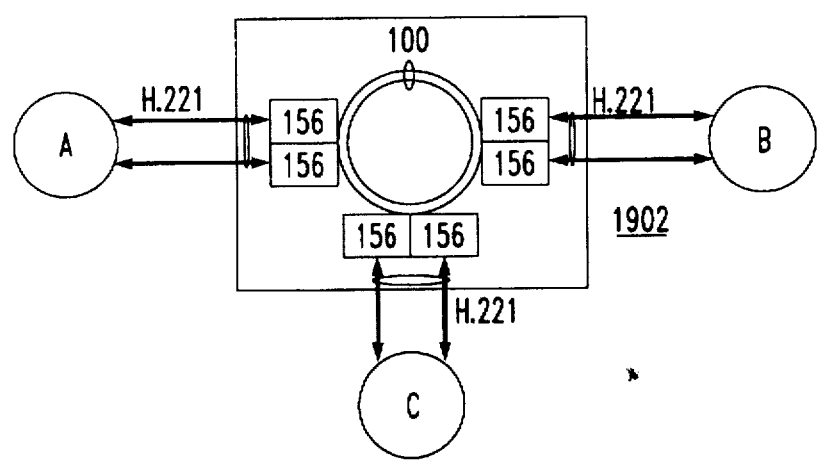
FIG. 19 is a progression sequence diagram of the conferee DROP feature for a multi-channel conference video call in the telecommunications system of FIG. 1.
Figure 19B:
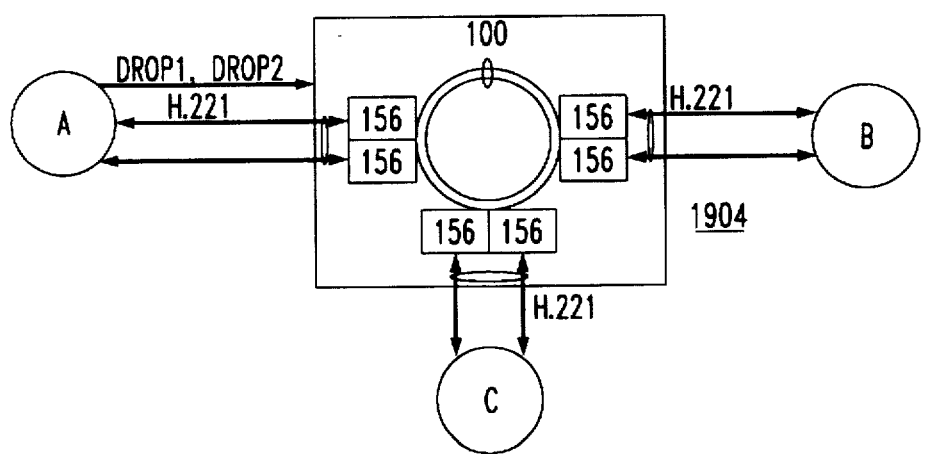
Figure 19C:
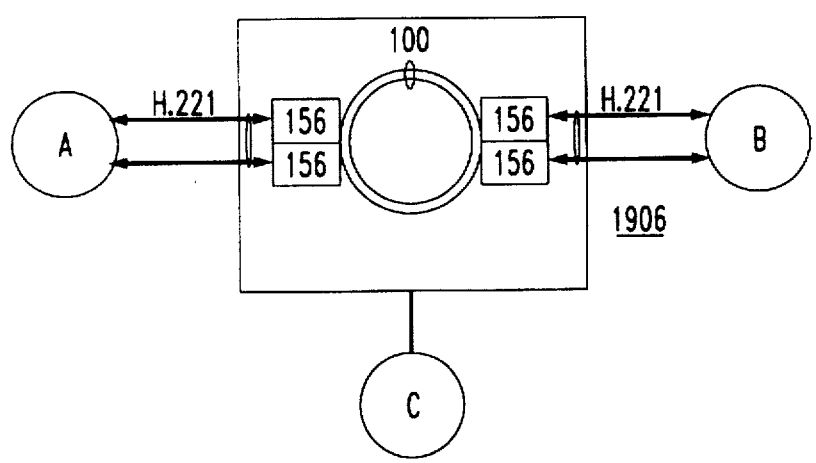
Figure 19D:
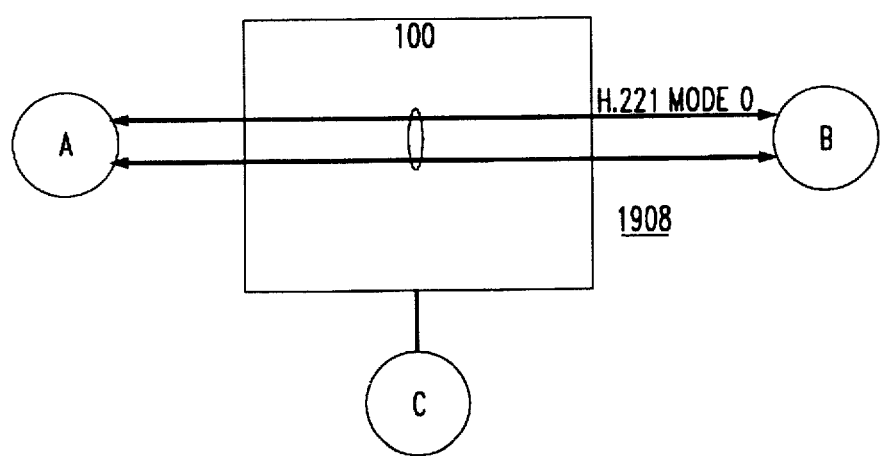
Figure 20A:
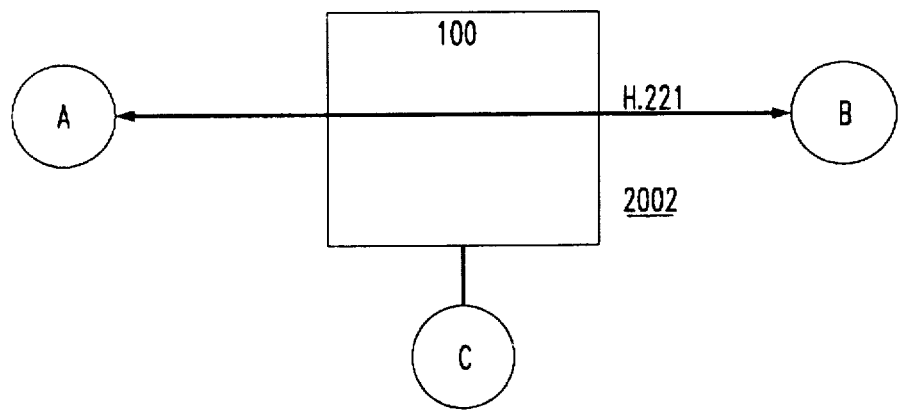
FIG. 20 is a progression sequence diagram of a TRANSFER feature for a single-channel point-to-point video call in the telecommunications system of FIG. 1.
Figure 20B:
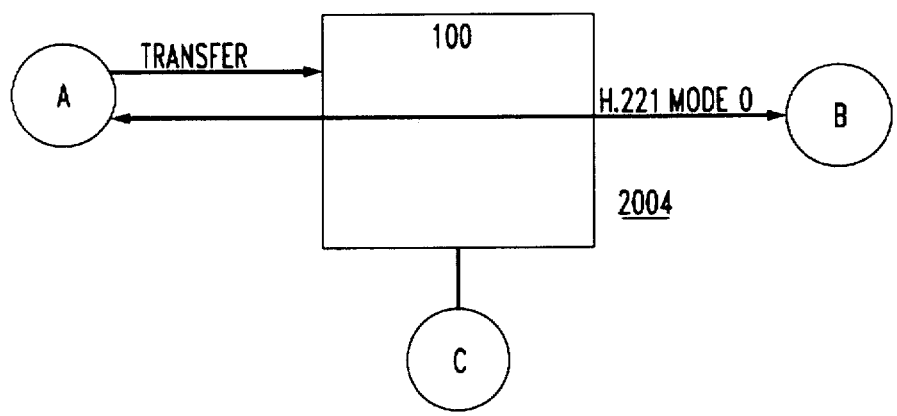
Figure 20C:
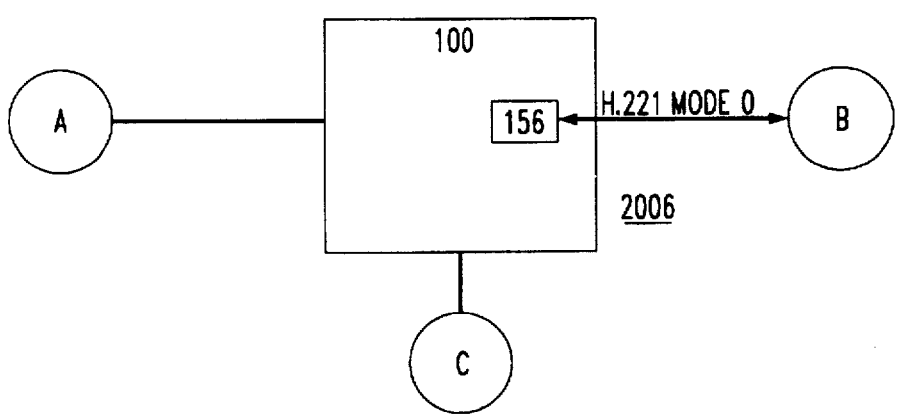
Figure 20D:
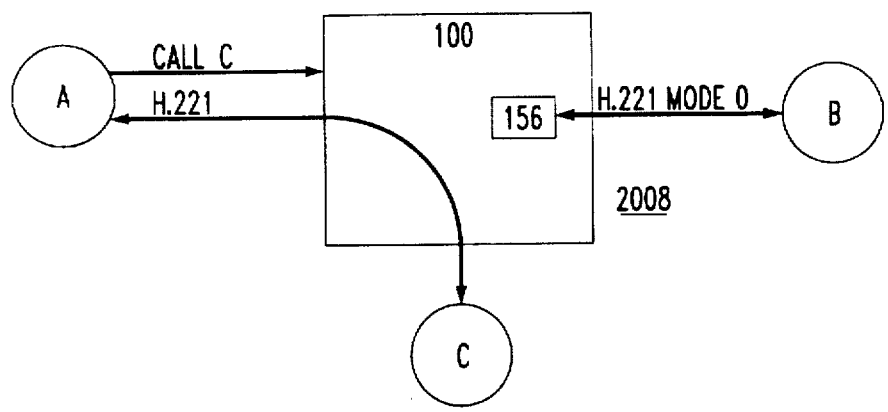
Figure 20E:
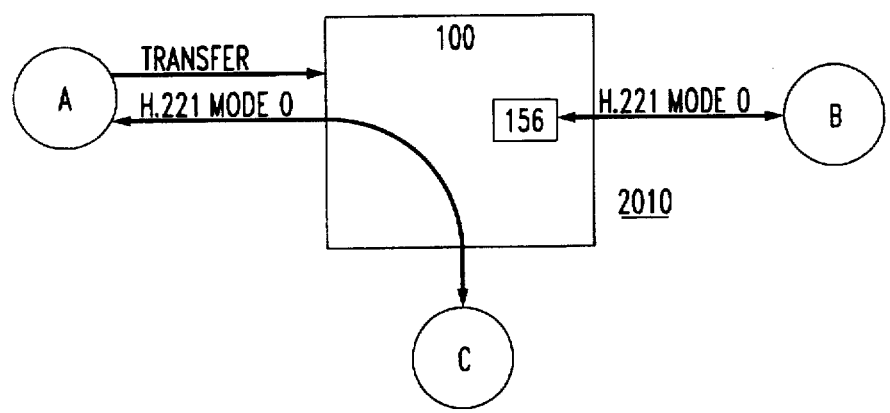
Figure 20F:
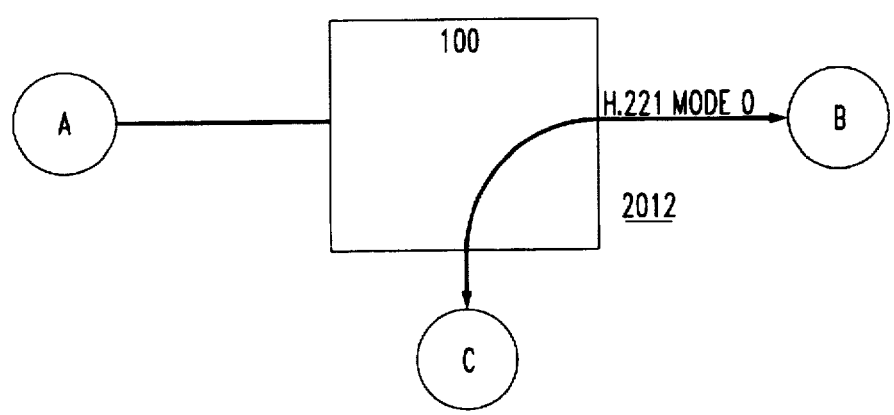
Figure 21A:
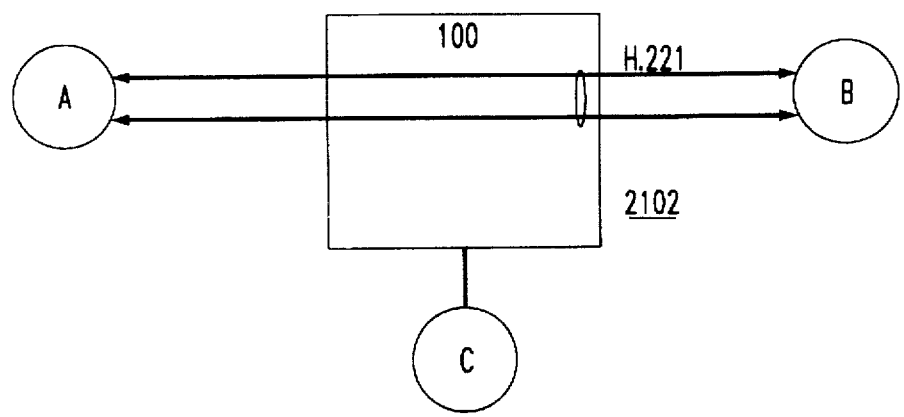
FIG. 21 is a progression sequence diagram of the TRANSFER feature for a multi-channel point-to-point video call in the telecommunications system of FIG. 1.
Figure 21B:
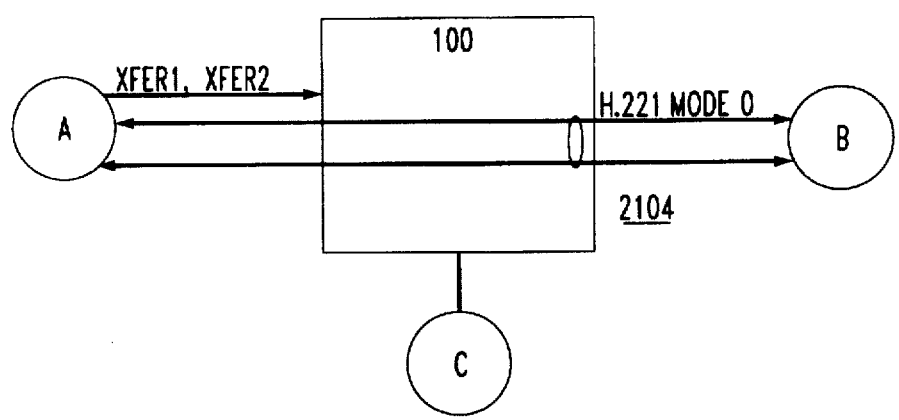
Figure 21C:
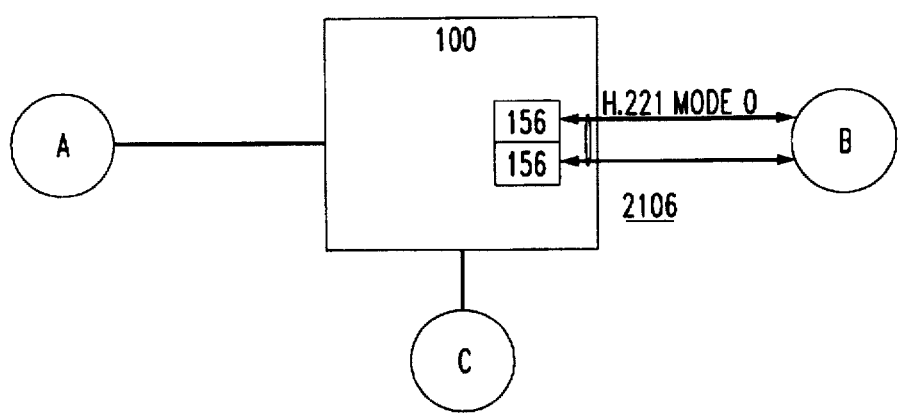
Figure 21D:
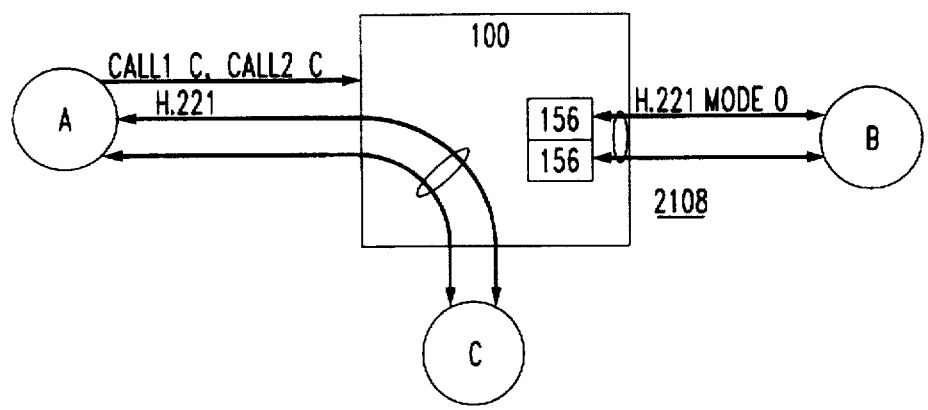
Figure 21E:
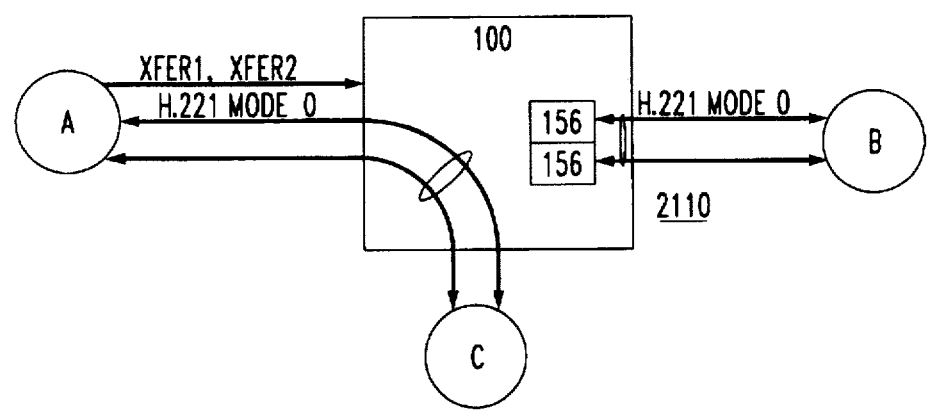
Figure 21F:
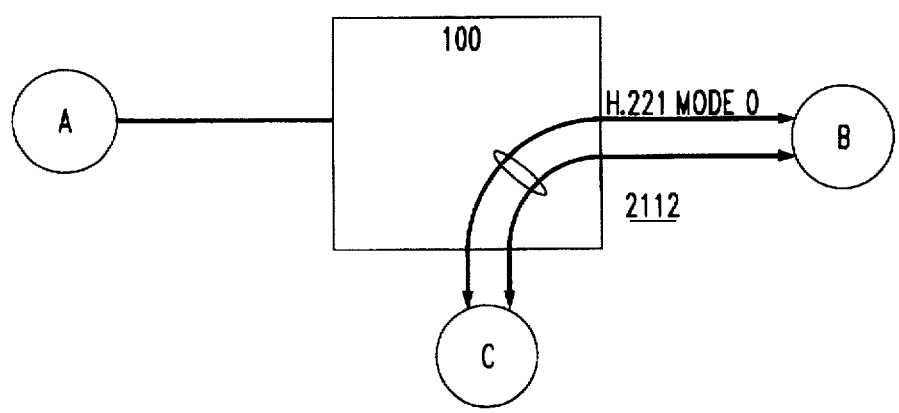

The processes of placing a multi-channel conference on hold and of taking a multi-channel conference off-hold merely respectively duplicate the processes of placing a single-channel conference on hold and of taking a single-channel conference off-hold for each channel of the multi-channel conference, as shown in views 1402–1406 of FIG. 14 and views 1502–1506 of FIG. 15, respectively.

A participant to a video conference can drop out of (i.e., permanently disconnect itself from) a conference. Assuming the existence of a single-channel conference call, shown in view 1602 of FIG. 12, terminal A drops out by sending a "DISCONNECT" message for the call to switching system 100 (over the ISDN D channel), as shown in view 1604 of FIG. 16. In response, connection management 172 of switching system 100 disconnects terminal A from the multi-media resources 156 that are allocated to this terminal's end of the call, by tearing down the talk and listen connections between the port circuit of terminal A and the multi-media resources 156 of terminal A's end of the call, and deallocates the now-excess multi-media resources 156 of terminal A's end of the call from the conference call (see steps 514–518 of FIG. 5), as represented in view 1606 of FIG. 16. If this had been a more-than three-way conference call, this would complete the changes caused by terminal A dropping out of the conference. However, in the case of this three-way conference call, application of the resource need and possession rules (see steps 304–322 of FIG. 3) leads to a determination that not only are the multi-media resources 156 of terminal A's end of the call no longer needed, but that all of the multi-media resources 156 involved in the call are now surplus. Hence, connection management 172 of switching system 100 freezes the video and "mode-0 forces" terminal B's and terminal C's ends of the conference call, disconnects all ends of the conference call from the multi-media resources 156, deallocates all of the multi-media resources 156 from the call, and reconnects terminal B's and terminal C's ends of the call directly together. The call is no longer a conference call and now has the form represented in view 1608 of FIG. 16.

The process of a participant dropping out of a multi-channel conference merely duplicates the process of a participant dropping out of a single-channel conference for each channel of the multi-channel conference, as shown in views 1702–1708 of FIG. 17.

The party that established a video conference call can drop the last party that joined the conference from the conference. Assuming the existence of a single-channel conference call, shown in view 1802 of FIG. 18, that was established by terminal A and last joined by terminal C (as shown in FIG. 10), terminal A drops terminal C from the conference by sending a "DROP" message for the call to switching system 100 (over the ISDN D channel), as shown in view 1804 of FIG. 18. The response of switching system 100 is the same as if terminal C had sent a "DISCONNECT" message for the call, as shown in views 1806 and 1808 of FIG. 18.

The process of dropping a party from a multi-channel conference merely duplicates the process of dropping a party from a single-channel conference for each channel of the multi-channel conference, as shown in views 1902–1908 of FIG. 19.

A point-to-point video call may be transferred by either party to a third party in much the same way that a conference call is established. Assume that a single-channel point-to-point video call that exists between terminals A and B, as shown in view 2002 of FIG. 20, is being transferred by terminal A to terminal C. Terminal A first puts the existing call on hold. This is shown by views 2004–2006 of FIG. 20, where the only difference from views 604–606 of FIG. 6 is that terminal A send a "TRANSFER" message instead of a "HOLD" message in view 2004. Having put the existing call on hold, terminal A now places a second multi-media single-channel call to video terminal C, and switching system 100 establishes the second call, all in a conventional manner. This is shown by view 2008 in FIG. 20. Terminal A then causes terminal C to freeze the present image transmission on the second call and "mode-0 forces" the second call, in a conventional manner, and also sends a second "TRANSFER" message for the second call to switching system 100. The calls now have the form shown by view 2010 in FIG. 20. In response to the second "transfer" message, call processing 170 of switching system 100 removes the port circuit identifier of terminal A's port circuit from the call records of both calls and then merges the two calls into one call. As a consequence of this merger, terminal A is no longer a part of the resultant call, and the resultant call has only two parties. In response (see steps 310–322 of FIG. 3), connection management 172 of switching system 100 disconnects terminal A from the call, causes the now-excess multi-media resources 156 that are allocated to terminal B's end of the resultant call to be disconnected and deallocated from the call, and connects terminal C's and terminal B's ends of the call directly together. Optionally, if the terminals A and B do not have the capability of initiating an H.320 capability (CAP) exchange on their own, connection management 172 also causes MMI 152 to initiate a CAP exchange just prior to disconnecting the multi-media resources 156 from the call, and the CAP exchange is then carried out between terminals A and B after they have been connected to each other by connection management 172. The call now has the form shown in view 2012 of FIG. 20.

The process of transferring a multi-channel point-to-point video call merely duplicates the process of transferring a single-channel point-to-point call for each channel of the multi-channel call, as shown in views 2102–2112 of FIG. 21.

Of course, various changes and modifications to the illustrative embodiment described above will be apparent to those skilled in the art. For example, in a three-party call connection, when one party is put on hold, the call connection may be converted to a point-to-point call connection. Or, call transfer may be treated as a conference, wherein the transferred-to party is added as a conferee and then the transferred-from party is dropped from the conference. Such changes and modifications can be made without departing from the spirit and the scope of the invention and without diminishing its attendant advantages. It is therefore intended that such changes and modifications be covered by the following claims.

The invention claimed is:

1. In a switching system for establishing and disestablishing switched communications connections between communications endpoints that are connected to the switching system, wherein communications are conducted by the endpoints through the established connections in a multi-media communications protocol whose signals constitute rules for governing the communications between the endpoints and are terminated at the communications endpoints without being terminated at the switching system, the improvement comprising:

means for terminating the protocol signals at the switching system, and means for dynamically inserting the terminating means into a selected already-established connection that is conducting communications whose protocol signals are being terminated at the communications endpoints without being terminated at the switching system, to terminate the protocol signals for the selected connection at the switching system, to enable the switching system to provide a communications feature for the communications on the selected connection.

2. The improvement of claim 1 further comprising:

means for dynamically removing the inserted terminating means from the selected connection without disestablishing the selected connection to cease terminating the protocol signals of the selected connection at the switching system, upon ceasing or completing the providing of the feature at the switching system for the communications on the selected connection.

3. The switching system of claim 2 wherein:

the means for dynamically removing comprise means for removing the inserted terminating means from the selected connection when (a) the connection does not connect any multi-media endpoints or (b) the connection connects to only one endpoint and the one endpoint is a multi-media endpoint or (c) the connection connects only two endpoints and both of the two endpoints are multi-media endpoints.

4. The switching system of claim 2 wherein:

the means for dynamically removing comprise means for removing the inserted terminating means from the selected connection when (a) the connection does not connect any multi-media endpoints or (b) the connection connects to only one endpoint and the one endpoint is a multi-media endpoint or (c) the connection connects only two endpoints and both of the two endpoints are multi-media endpoints and neither of the two endpoints is on hold.

5. The switching system of claim 1 wherein:

the means for dynamically inserting comprise means for inserting the terminating means into a selected already-established connection unless (a) the connection does not connect any multi-media endpoints or (b) the connection connects to only one endpoint and the one endpoint is a multi-media endpoint or (c) the connection connects only two endpoints and both of the two endpoints are multi-media endpoints.

6. The switching system of claim 1 wherein:

the means for dynamically inserting comprise means for inserting the terminating means into a selected already-established connection unless (a) the connection does not connect any multi-media endpoints or (b) the connection connects to only one endpoint and the one endpoint is a multi-media endpoint or (c) the connection connects only two endpoints and both of the two endpoints are multi-media endpoints and neither of the two endpoints is on hold.

7. The improvement of claim 1 wherein the selected connection comprises call paths of a plurality of calls.

8. The improvement of claim 1 wherein the selected connection comprises individually-switched call paths of a plurality of associated calls.

9. A switching system comprising:

a plurality of communications ports for connecting the switching system to communications endpoints;

a switching fabric interconnecting the plurality of ports for establishing and disestablishing switched communications paths between selected ones of the ports to enable endpoints that are connected to ports that have a path established between them to conduct a call through the path in a multi-media communications protocol whose signals constitute rules for governing the call between the communications endpoints, and pass between the endpoints where they are terminated, without being terminated at the switching system;

means for terminating the protocol signals at the switching system;

means for first determining that the protocol signals of an individual existing call, whose protocol signals are being terminated at the communications endpoints without being terminated at the switching system, need to be terminated at the switching system, and for second determining that the protocol signals of the individual existing call no longer need to be terminated at the switching system;

means responsive to the first determination of the determining means for causing the switching fabric to connect the terminating means into the path of the existing call in order to commence terminating the protocol signals of the existing call at the switching system, and responsive to the second determination of the determining means for causing the switching fabric to disconnect the terminating means from the path of the existing call in order to cease terminating the protocol signals of the existing call at the switching system and resume passing the protocol signals between endpoints that have the path established between them without terminating the protocol signals at the switching system.

10. The switching system of claim 9 wherein:

the means for determining comprise means for making the first determination unless, and for making the second determination when, (a) the individual existing call does not involve any multi-media endpoints or (b) the individual existing call involves only one endpoint and the one endpoint is a multi-media endpoint or (c) the individual existing call involves only two endpoints and each of the two endpoints is a multi-media endpoint.

11. The switching system of claim 9 wherein:

the means for determining comprise means for making the first determination unless, and for making the second determination when, (a) the individual existing call does not involve any multi-media endpoints or (b) the individual existing call involves only one endpoint and the one endpoint is a multi-media endpoint or (c) the individual existing call involves only two endpoints and each of the two endpoints is a multi-media endpoint and neither of the two endpoints is on hold.

12. The switching system of claim 9 wherein:

the means for determining comprise means for firstly determining that a first endpoint desires to place on hold an individual existing call between the first and a second endpoint; and the causing means comprise means responsive to the first determination for causing the switching fabric to disconnect the first endpoint from the call path of the individual existing call and to reconnect the call path to the terminating means.

13. The switching system of claim 12 wherein:

the causing means further comprise means responsive to the first determination for causing the switching fabric to connect a source of recorded communications to the call path through the terminating means.

14. The switching system of claim 12 wherein:

the means for determining further comprise means for secondly determining that the first endpoint desires to take the individual existing call off hold; and the causing means comprise means responsive to the second determination for causing the switching fabric to disconnect the call path of the individual existing call from the terminating means and to reconnect the call path to the first endpoint.

15. The switching system of claim 9 wherein:

the means for determining comprise means for firstly determining that a first endpoint desires to conference a second endpoint into an individual existing call between the first and a third endpoint; and the causing means comprise means responsive to the first determination for causing the switching fabric to disconnect the first endpoint from the call path of the individual existing call and to reconnect the call path to the terminating means, then to establish a new call path between the first endpoint and the third endpoint that bypasses the terminating means, and then to insert the terminating means into the new call path to combine the call path of the individual existing call and the new call path into a call path of a conference call between the first, second, and third terminals.

16. The switching system of claim 9 wherein:

the means for determining comprise means for firstly determining that a first endpoint desires to initiate transfer of an individual existing call between the first and a second endpoint to a third endpoint, and for secondly determining that the first endpoint desires to complete the transfer; and the causing means comprise means responsive to the first determination for causing the switching fabric to disconnect the first endpoint from the call path of the individual existing call and to reconnect the call path to the terminating means and then to establish a new call path between the first endpoint and the third endpoint that bypasses the terminating means, and responsive to the second determination for causing the switching fabric to disconnect the first endpoint from the new call path, to disconnect the call path of the individual existing call from the terminating means, and to connect together the call path of the individual existing call and the new call path into a call path of a new call between the second endpoint and the third endpoint.

17. A method of providing communications features for communications in a switching system that establishes and disestablishes switched communications connections between communications endpoints that are connected to the switching system, comprising the steps of:

establishing a switched communications connection between selected endpoints;

conducting communications between the selected endpoints through the connection in a multi-media communications protocol whose signals constitute rules for governing the communications between the endpoints and are terminated at the communications endpoints, without terminating the signals of the protocol at the switching system;

dynamically inserting at the switching system an arrangement for terminating the protocol signals into the connection that is conducting the communications whose protocol signals are terminated at the communications endpoints without being terminated at the switching system, to terminate the protocol signals of the connection at the switching system in order to enable the switching system to provide a communications feature for the communications on the connection; and providing the communications feature.

18. The method of claim 17 further comprising the steps of:

ceasing or completing the providing of the communications feature;

dynamically removing the arrangement for terminating the protocol signals from the connection at the switching system to cease terminating the protocol signals of the connection at the switching system upon ceasing or completing the providing of the communications feature; and resuming conducting communications between endpoints through the connection in the protocol without terminating the protocol signals at the switching system.

19. In a switching system for establishing and disestablishing switched communications connections between communications endpoints that are connected to the switching system, wherein communications are conducted by the endpoints through the established connections in a multimedia communications protocol whose signals are not terminated at the switching system, the improvement comprising:

means for terminating the signals of the protocol, which comprises the ITU H.221 protocol, at the switching system, and means for dynamically inserting the terminating means into a selected already-established connection to terminate the protocol signals for the selected connection at the switching system, to provide a communications feature at the switching system for the communications on the selected connection.

20. The improvement of claim 19 further comprising:

means for dynamically removing the inserted terminating means from the selected connection without disestablishing the selected connection to cease terminating the protocol signals of the selected connection at the switching system, upon ceasing or completing the providing of the feature at the switching system for the communications on the selected connection.

21. The switching system of claim 20 wherein:

the means for dynamically removing comprise means for removing the inserted terminating means from the selected connection when (a) the connection does not connect any multi-media endpoints or (b) the connection connects to only one endpoint and the one endpoint is a multi-media endpoint or (c) the connection connects only two endpoints and both of the two endpoints are multi-media endpoints.

22. The switching system of claim 20 wherein:

the means for dynamically removing comprise
means for removing the inserted terminating means from the selected connection when (a) the connection does not connect any multi-media endpoints or (b) the connection connects to only one endpoint and the one endpoint is a multi-media endpoint or (c) the connection connects only two endpoints and both of the two endpoints are multi-media endpoints and neither of the two endpoints is on hold.

23. The switching system of claim 19 wherein the protocol comprises the ITU H.320 protocol.

24. The switching system of claim 19 wherein:

the means for dynamically inserting comprise
means for inserting the terminating means into a selected already-established connection unless (a) the connection does not connect any multi-media endpoints or (b) the connection connects to only one endpoint and the one endpoint is a multi-media endpoint or (c) the connection connects only two endpoints and both of the two endpoints are multi-media endpoints.

25. The switching system of claim 19 wherein:

the means for dynamically inserting comprise
means for inserting the terminating means into a selected already-established connection unless (a) the connection does not connect any multi-media endpoints or (b) the connection connects to only one endpoint and the one endpoint is a multi-media endpoint or (c) the connection connects only two endpoints and both of the two endpoints are multi-media endpoints and neither of the two endpoints is on hold.

26. The improvement of claim 19 wherein the selected connection comprises call paths of a plurality of calls.

27. The improvement of claim 19 wherein the selected connection comprises individually-switched call paths of at plurality of associated calls.

28. A switching system comprising:

a plurality of communications ports for connecting the switching system to communications endpoints;

a switching fabric interconnecting the plurality of ports for establishing and disestablishing switched communications paths between selected ones of the ports to enable endpoints that are connected to ports that have a path established between them to conduct a call through the path in a multi-media communications protocol which comprises the ITU H.221 protocol and whose signals pass between the endpoints without being terminated at the switching system;

means for terminating the protocol signals at the switching system;

means for first determining that the protocol signals of an individual existing call need to be terminated at the switching system, and for second determining that the protocol signals of the individual existing call no longer need to be terminated at the switching system;

means responsive to the first determination of the determining means for causing the switching fabric to connect the terminating means into the path of the existing call in order to commence terminating the protocol signals of the existing call at the switching system, and responsive to the second determination of the determining means for causing the switching fabric to disconnect the terminating means from the path of the existing call in order to cease terminating the protocol signals of the existing call at the switching system and resume passing the protocol signals between endpoints that have the path established between them without terminating the protocol signals at the switching system.

29. The switching system of claim 28 wherein the protocol comprises the ITU H.320 protocol.

30. The switching system of claim 28 wherein:

the means for determining comprise
means for making the first determination unless, and for making the second determination when, (a) the individual existing call does not involve any multi-media endpoints or (b) the individual existing call involves only one endpoint and the one endpoint is a multi-media endpoint or (c) the individual existing call involves only two endpoints and each of the two endpoints is a multi-media endpoint.

31. The switching system of claim 28 wherein:

the means for determining comprise
means for making the first determination unless, and for making the second determination when, (a) the individual existing call does not involve any multi-media endpoints or (b) the individual existing call involves only one endpoint and the one endpoint is a multi-media endpoint or (c) the individual existing call involves only two endpoints and each of the two endpoints is a multi-media endpoint and neither of the two endpoints is on hold.

32. The switching system of claim 28 wherein:

the means for determining comprise
means for firstly determining that a first endpoint desires to place on hold an individual existing call between the first and a second endpoint; and the causing means comprise
means responsive to the first determination for causing the switching fabric to disconnect the first endpoint from the call path of the individual existing call and to reconnect the call path to the terminating means.

33. The switching system of claim 32 wherein:

the causing means further comprise
means responsive to the first determination for causing the switching fabric to connect a source of recorded communications to the call path through the terminating means.

34. The switching system of claim 32 wherein:

the means for determining further comprise
means for secondly determining that the first endpoint desires to take the individual existing call off hold; and the causing means comprise
means responsive to the second determination for causing the switching fabric to disconnect the call path of the individual existing call from the terminating means and to reconnect the call path to the first endpoint.

35. The switching system of claim 28 wherein:

the means for determining comprise
means for firstly determining that a first endpoint desires to initiate transfer of an individual existing call between the first and a second endpoint to a third endpoint, and for secondly determining that the first endpoint desires to complete the transfer; and the causing means comprise means responsive to the first determination for causing the switching fabric to disconnect the first endpoint from the call path of the individual existing call and to reconnect the call path to the terminating means and then to establish a new call path between the first endpoint and the third endpoint that bypasses the terminating means, and responsive to the second determination for causing the switching fabric to disconnect the first endpoint from the new call path, to disconnect the call path of the individual existing call from the terminating means, and to connect together the call path of the individual existing call and the new call path into a call path of a new call between the second endpoint and the third endpoint.

36. A switching system comprising:

a plurality of communications ports for connecting the switching system to communications endpoints;

a switching fabric interconnecting the plurality of ports for establishing and disestablishing switched communications paths between selected ones of the ports to enable endpoints that are connected to ports that have at least two paths established between them to conduct at least two associated calls through the at least two paths in a multi-media communications protocol whose signals pass between the endpoints through the at least two paths without being terminated at the switching system;

means for terminating the protocol signals at the switching system on a plurality of paths:

means for first determining that the protocol signals of all of at least two associated existing calls need to be terminated at the switching system, and for second determining that the protocol signals of all of the at least two associated existing calls no longer need to be terminated at the switching system; and means responsive to the first determination for causing the switching fabric to connect the terminating means into the paths of all of the at least two associated existing calls in order to commence terminating the protocol signals of the at least two existing calls at the switching system, and responsive to the second determination for causing the switching fabric to disconnect the terminating means from the paths of all of the at least two associated existing calls in order to cease terminating the protocol signals of the at least two existing calls at the switching system and resume passing the protocol signals between endpoints that have the paths established between them without terminating the protocol signals at the switching system.

37. A switching system comprising a plurality of communications ports for connecting the switching system to communications endpoints;

a switching fabric interconnecting the plurality of ports for establishing and disestablishing switched communications paths between selected ones of the ports to enable endpoints that are connected to ports that have a path established between them to conduct a call through the path in a multi-media communications protocol whose signals pass between the endpoints without being terminated at the switching system;

means for terminating the protocol signals at the switching system;

means for first determining that the protocol signals of an individual existing call need to be terminated at the switching system, and for second determining that the protocol signals of the individual existing call no longer need to be terminated at the switching system; and means responsive to the first determination of the determining means for causing the switching fabric to connect the terminating means into the path of the existing call in order to commence terminating the protocol signals of the existing call at the switching system, and responsive to the second determination of the determining means for causing the switching fabric to disconnect the terminating means from the path of the existing call in order to cease terminating the protocol signals of the existing call at the switching system and resume passing the protocol signals between endpoints that have the path established between them without terminating the protocol signals at the switching system, wherein:

the means for determining comprise means for firstly determining that a first endpoint desires to conference a second endpoint into an individual existing call between the first and a third endpoint, and for thirdly determining that one of the first, second, and third endpoints desires to place the conference call on hold; and the causing means comprise means responsive to the first determination for causing the switching fabric to disconnect the first endpoint from the call path of the individual existing call and to reconnect the call path to the terminating means, then to establish a new call path between the first endpoint and the third endpoint that bypasses the terminating means, and then to insert the terminating means into the new call path to combine the call path of the individual existing call and the new call path into a call path of a conference call between the first, second, and third terminals, and responsive to the third determination for causing the switching fabric to disconnect the one endpoint from the call path of the conference call.

38. The switching system of claim 37 wherein:

the means for determining further comprise means for fourthly determining that the one endpoint desires to take the conference call off hold; and the causing means comprise means responsive to the fourth determination for causing the switching fabric to reconnect the one endpoint to the call path of the conference call.

39. A switching system comprising a plurality of communications ports for connecting the switching system to communications endpoints;

a switching fabric interconnecting the plurality of ports for establishing and disestablishing switched communications paths between selected ones of the ports to enable endpoints that are connected to ports that have a path established between them to conduct a call through the path in a multi-media communications protocol whose signals pass between the endpoints without being terminated at the switching system;

means for terminating the protocol signals at the switching system;

means for first determining that the protocol signals of an individual existing call need to be terminated at the switching system, and for second determining that the protocol signals of the individual existing call no longer need to be terminated at the switching system; and means responsive to the first determination of the determining means for causing the switching fabric to connect the terminating means into the path of the existing call in order to commence terminating the protocol signals of the existing call at the switching system, and responsive to the second determination of the determining means for causing the switching fabric to disconnect the terminating means from the path of the existing call in order to cease terminating the protocol signals of the existing call at the switching system and resume passing the protocol signals between endpoints that have the path established between them without terminating the protocol signals at the switching system, wherein:

the means for determining comprise means for firstly determining that a first endpoint desires to conference a second endpoint into an individual existing call between the first and a third endpoint, and for secondly determining that one of the first, second, and third endpoints desires to disconnect from the conference call, and the causing means comprise means responsive to the first determination for causing the switching fabric to disconnect the first endpoint from the call path of the individual existing call and to reconnect the call path to the terminating means, then to establish a new call path between the first endpoint and the third endpoint that bypasses the terminating means, and then to insert the terminating means into the new call path to combine the call path of the individual existing call and the new call path into a call path of a conference call between the first, second, and third terminals, and responsive to the second determination for causing the switching fabric to disconnect the one endpoint from the call path of the conference call and then to remove the terminating means from the call path of the conference call to establish a point-to-point call between the second and the third endpoints.

40. A switching system comprising a plurality of communications ports for connecting the switching system to communications endpoints;

a switching fabric interconnecting the plurality of ports for establishing and disestablishing switched communications paths between selected ones of the ports to enable endpoints that are connected to ports that have a path established between them to conduct a call through the path in a multi-media communications protocol whose signals pass between the endpoints without being terminated at the switching system;

means for terminating the protocol signals at the switching system;

means for first determining that the protocol signals of an individual existing call need to be terminated at the switching system, and for second determining that the protocol signals of the individual existing call no longer need to be terminated at the switching system; and means responsive to the first determination of the determining means for causing the switching fabric to connect the terminating means into the path of the existing call in order to commence terminating the protocol signals of the existing call at the switching system, and responsive to the second determination of the determining means for causing the switching fabric to disconnect the terminating means from the path of the existing call in order to cease terminating the protocol signals of the existing call at the switching system and resume passing the protocol signals between endpoints that have the path established between them without terminating the protocol signals at the switching system, wherein:

the means for determining comprise means for firstly determining that a first endpoint desires to conference a second endpoint into an individual existing call between the first and a third endpoint, and for secondly determining that one of the first, second, and third endpoints desires to drop another of the first, second, and third endpoints from the conference call; and the causing means comprise means responsive to the first determination for causing the switching fabric to disconnect the first endpoint from the call path of the individual existing call and to reconnect the call path to the terminating means, then to establish a new call path between the first endpoint and the third endpoint that bypasses the terminating means, and then to insert the terminating means into the new call path to combine the call path of the individual existing call and the new call path into a call path of a conference call between the first, second, and third terminals, and responsive to the second determination for causing the switching fabric to disconnect the other endpoint from the call path of the conference call and then to remove the terminating means from the call path of the conference call to establish a point-to-point call between the endpoints that remain on the call.

41. A method of providing communications features for communications in a switching system that establishes and disestablishes switched communications connections between communications endpoints that are connected to the switching system, comprising the steps of:

establishing a switched communications connection between selected endpoints;

conducting communications between the selected endpoints through the connection in a multi-media communications protocol which comprises the ITU H.221 protocol without terminating signals of the protocol at the switching system; dynamically inserting an arrangement for terminating the protocol signals into the connection at the switching system to terminate the protocol signals of the connection at the switching system in order to provide a communications feature for the communications on the connection at the switching system; and providing the communications feature.

42. The method of claim 41 further comprising the steps of:

ceasing or completing the providing of the communications feature;

dynamically removing the arrangement for terminating the protocol signals from the connection at the switching system to cease terminating the protocol signals of the connection at the switching system upon ceasing or completing the providing of the communications feature; and resuming conducting communications between endpoints through the connection in the protocol without terminating the protocol signals at the switching system.

43. The method of claim 42 wherein the protocol comprises the ITU H.320 protocol.

* * * * *